(12) United States Patent
Sessego et al.

(10) Patent No.: US 9,400,226 B2
(45) Date of Patent: Jul. 26, 2016

(54) METHODS AND APPARATUS FOR CALIBRATING TRANSDUCER-INCLUDING DEVICES

(71) Applicants: Raimondo P. Sessego, Chandler, AZ (US); Peter T. Jones, Scottsdale, AZ (US); Seyed K. Paransun, Scottsdale, AZ (US); James D. Stanley, Phoenix, AZ (US); William D. McWhorter, Goodyear, AZ (US)

(72) Inventors: Raimondo P. Sessego, Chandler, AZ (US); Peter T. Jones, Scottsdale, AZ (US); Seyed K. Paransun, Scottsdale, AZ (US); James D. Stanley, Phoenix, AZ (US); William D. McWhorter, Goodyear, AZ (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 539 days.

(21) Appl. No.: 13/859,490

(22) Filed: Apr. 9, 2013

(65) Prior Publication Data

US 2014/0303926 A1    Oct. 9, 2014

(51) Int. Cl.
| | |
|---|---|
| *G01C 19/00* | (2013.01) |
| *G01C 25/00* | (2006.01) |
| *G01L 25/00* | (2006.01) |
| *G01P 21/00* | (2006.01) |

(52) U.S. Cl.
CPC .............. *G01L 25/00* (2013.01); *G01C 25/005* (2013.01); *G01P 21/00* (2013.01)

(58) Field of Classification Search
CPC ....................................................... G01L 25/00
See application file for complete search history.

(56) References Cited

U.S. PATENT DOCUMENTS

| | | |
|---|---|---|
| 4,558,426 A | 12/1985 | Solt, Jr. |
| 4,956,602 A | 9/1990 | Parrish |
| 5,521,393 A | 5/1996 | Burkholder et al. |

(Continued)

FOREIGN PATENT DOCUMENTS

| | | |
|---|---|---|
| EP | 2284546 A2 | 2/2011 |
| GB | 2478561 * | 9/2011 |

(Continued)

OTHER PUBLICATIONS

EP Application 14163199.4-1557, Extended Search Report mailed Jul. 30, 2014, pp. 1-8.

(Continued)

*Primary Examiner* — Phuong Huynh
(74) *Attorney, Agent, or Firm* — Sherry W. Schumm

(57) ABSTRACT

Embodiments of systems for calibrating transducer-including devices include a board support structure, one or more motors, a motor control module, and a calibration control module. The board support structure holds a calibration board in a fixed position with respect to the board support structure. The motor(s) rotate the board support structure around one or more axes of a fixed coordinate system. The motor control module sends motor control signals to the motor(s) to cause the motor(s) to move the board support structure through a series of orientations with respect to the fixed coordinate system. The calibration control module sends, through a communication structure, signals to the transducer-including devices, which are loaded into a plurality of sockets of the calibration board. The signals cause the transducer-including devices to generate transducer data while the board support structure is in or moving toward each orientation of the series of orientations.

20 Claims, 9 Drawing Sheets

(56) References Cited

U.S. PATENT DOCUMENTS

| | | |
|---|---|---|
| 5,617,431 A | 4/1997 | Tupuri et al. |
| 6,209,383 B1 | 4/2001 | Mueller |
| 6,243,654 B1 | 6/2001 | Johnson et al. |
| 6,321,171 B1 | 11/2001 | Baker |
| 6,629,448 B1 | 10/2003 | Cvencara |
| 6,758,080 B1 | 7/2004 | Ragan et al. |
| 7,043,960 B1 | 5/2006 | Lueck |
| 7,326,922 B1 | 2/2008 | Mueller |
| 7,852,109 B1 | 12/2010 | Chan et al. |
| 7,892,876 B2 | 2/2011 | Mehregany |
| 7,930,148 B1 | 4/2011 | Figaro et al. |
| 8,013,759 B1 | 9/2011 | Aid et al. |
| 8,117,888 B2 | 2/2012 | Chan et al. |
| 2007/0023851 A1 | 2/2007 | Hartzell et al. |
| 2007/0095146 A1 | 5/2007 | Brosh |
| 2007/0205982 A1 | 9/2007 | Ishidera et al. |
| 2007/0216361 A1 | 9/2007 | Zelinski et al. |
| 2007/0277586 A1 | 12/2007 | Kamiya |
| 2008/0081958 A1 | 4/2008 | Denison et al. |
| 2011/0029275 A1 | 2/2011 | Kennedy et al. |
| 2011/0154050 A1 | 6/2011 | Cordery et al. |
| 2011/0288772 A1 | 11/2011 | Tanino |
| 2012/0203486 A1 | 8/2012 | Almalki et al. |
| 2012/0215477 A1 | 8/2012 | Tuck et al. |
| 2013/0297248 A1 | 11/2013 | Dawson et al. |

FOREIGN PATENT DOCUMENTS

| | | |
|---|---|---|
| GB | 2478561 A | 9/2011 |
| JP | 2005326384 A | 11/2005 |
| TW | 201128194 A | 8/2011 |

OTHER PUBLICATIONS

Ciganda Brasca, L.M., et al., "A Parallel Tester Architecture for Accelerometer and Gyroscope MEMS Calibration and Test", Journal of Electronic Testing; Theory and Applications, Mar. 11, 2011.

EP Application No. 13180554.1, Extended Search Report and Opinion, mailed Jan. 14, 2014.

U.S. Appl. No. 13/465,651, Dawson, C.S., et al., "Tester and Method for Testing a Strip of Devices", filed May 7, 2012.

EP Application No. 14163199.41557, Office Action mailed Sep. 7, 2015, 6 pages.

Non-Final Office Action mailed Aug. 17, 2015 for U.S. Appl. No. 13/962,717, 10 pages.

\* cited by examiner

METHODS AND APPARATUS FOR CALIBRATING TRANSDUCER-INCLUDING DEVICES

TECHNICAL FIELD

Embodiments of the subject matter described herein relate generally to methods and apparatus for calibrating devices that include one or more transducers.

BACKGROUND

Accelerometers are being incorporated into an ever expanding variety of electronic systems. For example, MEMS (MicroElectroMechanical System) accelerometers now are commonly used in automotive systems and in consumer and industrial electronics.

After fabricating a MEMS accelerometer, a calibration process typically is performed in the factory to determine trim adjustment values for each accelerometer sensing axis. The trim adjustment values may then be stored in a memory of a device within which the accelerometer ultimately is incorporated.

Conventional methods of calibrating accelerometers tend either to use expensive device handling and calibration equipment, or to perform the calibrations with low levels of automation and/or parallelism (e.g., only a single device or a small number of devices are calibrated simultaneously). High equipment expense and/or deficiencies in automation and/or parallelism detrimentally impact accelerometer manufacturing costs. Accelerometer manufacturers are forced to absorb the costs by offering products at lower margins and/or by including the relatively high manufacturing costs in their product pricing, potentially making their products less competitive in the marketplace.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation or embodiment described herein as exemplary or as an example is not necessarily to be construed as preferred or advantageous over other implementations or embodiments. Furthermore, there is no intention to be bound by any expressed or implied theory presented in the preceding technical field, background, or the following detailed description.

Embodiments of the subject matter described herein include methods and apparatus for calibrating (or "trimming") devices that include one or more transducers ("transducer-including devices"), and more specifically devices that include one or more sensors configured to sense gravitational force, movement (e.g., acceleration, rotation), electromagnetic field strength, pressure, and so on. For example, various embodiments of the calibration methods and apparatus discussed herein may be used in conjunction with devices having any combination of one or more accelerometers, gyroscopes, magnetometers (or "magnetic sensors"), pressure sensors, and/or other types of sensors. Embodiments more specifically relate to calibrating sensors included within packaged devices, where the sensors produce electrical signals indicating the magnitudes of various accelerations, forces, and/or fields with respect to one or more device-fixed axes or surfaces. An example of a packaged device that may be calibrated using the various calibration methods and apparatus is discussed below in conjunction with FIG. 1.

Figure 1:
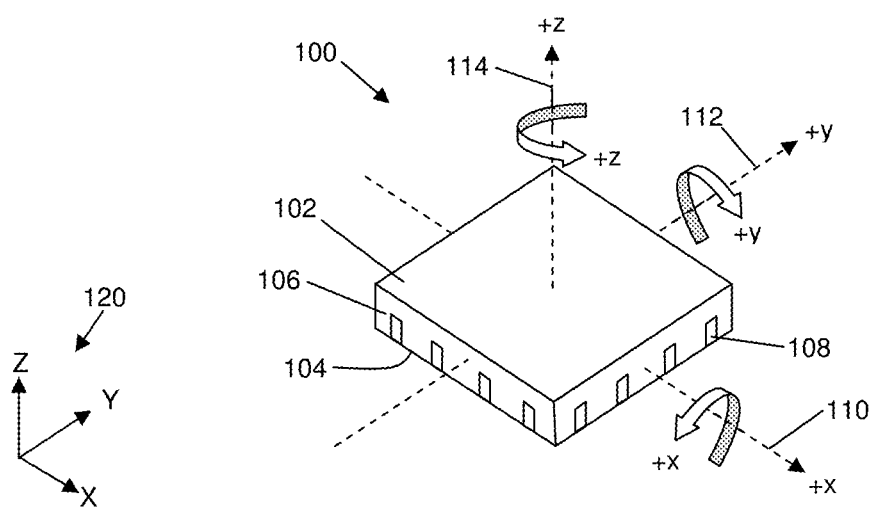
FIG. 1 is an external view of a transducer-including device, in accordance with an example embodiment.

More specifically, FIG. 1 is an external view of a transducer-including device 100, in accordance with an example embodiment. Device 100 includes various internal electrical components (e.g., transducers and other components) housed within a package body. For example, as will be discussed in more detail in conjunction with FIG. 2, device 100 may include any combination of one or more accelerometers (e.g., accelerometers 212-214, FIG. 2), gyroscopes (e.g., gyroscopes 222-224, FIG. 2), magnetometers (e.g., magnetometers 232-234, FIG. 2), pressure sensors, and/or other types of sensors.

The package body is defined by a top surface 102, a bottom surface 104, and side surfaces 106. Conductive contacts 108 exposed at an exterior of the package body facilitate communication between the internal electrical components and external electrical systems (not illustrated in FIG. 1). For example, contacts 108 provide for communication of various signals and voltage references (e.g., power and ground) between the internal electrical components and an external electrical system. Contacts 108 are shown in FIG. 1 as being essentially flush with the side surfaces 106 of the package body, and thus the device 100 may be considered to be a "leadless" package. However, the various embodiments also may be implemented using packages with protruding leads (i.e., packages with leaded chip carriers), packages with contact arrays (e.g., ball grid array (BGA) packages, pin grid array (PGA) packages, and so on). In addition, although contacts 108 are shown to be exposed at the side surfaces 106 of the device 100, the various embodiments also may be implemented using packages with contacts that are exposed on any surface (e.g., all four side surfaces 106, only two side surfaces 106, the top surface 102, and/or the bottom surface 104). Finally, a device may have more or fewer contacts 108 than is shown in the example device 100 of FIG. 1.

According to various embodiments, the transducers within device 100 may be configured to produce electrical signals indicating the magnitudes of various accelerations, forces, fields, and/or rotation velocities with respect to one or more device-fixed axes, such as orthogonal, device-fixed axes 110, 112, and 114, arbitrarily labeled as "x," "y," and "z," respectively for convenience. The device-fixed axes 110, 112, 114 are fixed with respect to the device 100, and according to an embodiment, each device-fixed axis 110, 112, 114 may be aligned with a sensing axis of one or more transducers within the device 100 (e.g., x-axis 110 may be aligned with the sensing axis of an x-axis accelerometer 212, an x-axis gyroscope 222, and/or an x-axis magnetometer 232, FIG. 2). As device 100 is moved in space, each of the device-fixed axes 110, 112, 114 may be angularly offset from corresponding orthogonal axes of an inertial coordinate system (e.g., orthogonal axes "X," "Y," and "Z" of a fixed, inertial coordinate system 120). In the description herein, it is to be assumed that the Earth's gravity field is in the −Z direction of the inertial coordinate system 120. Further, as will be explained in more detail below, it is to be assumed that device 100 is held in a fixed orientation in space by a structure (not shown) that exerts a reaction force on the device 100 in the +Z direction. Accordingly, when device 100 is in the orientation shown in FIG. 1 (i.e., with zero angular difference between z-axis 114 and the corresponding Z-axis of inertial coordinate system 120), the device 100 would experience a +1 G acceleration due to gravity along its z-axis 114 in the +Z direction of the inertial coordinate system 120. Conversely, the device 100 would experience a 0 G acceleration due to gravity (i.e., no acceleration) along its x- and y-axes 110, 112.

According to an embodiment, device 100 includes a three-axis accelerometer, with a first accelerometer (e.g., accelerometer 212, FIG. 2) configured to sense the magnitude of a force along the x-axis 110, a second accelerometer (e.g., accelerometer 213, FIG. 2) configured to sense the magnitude of a force along the y-axis 112, and a third accelerometer (e.g., accelerometer 214, FIG. 2) configured to sense the magnitude of a force along the z-axis 114. Alternatively, device 100 may include a one-axis or a two-axis accelerometer, or no accelerometer at all. In addition or alternatively, device 100 may include a three-axis gyroscope in an embodiment, which includes a first gyroscope (e.g., gyroscope 222, FIG. 2) configured to sense the rate of rotation around the x-axis 110, a second gyroscope (e.g., gyroscope 223, FIG. 2) configured to sense the rate of rotation around the y-axis 112, and a third gyroscope (e.g., gyroscope 224, FIG. 2) configured to sense the rate of rotation around the z-axis 114. Alternatively, device 100 may include a one-axis or a two-axis gyroscope, or no gyroscope at all. In addition or alternatively, device 100 may include a three-axis magnetometer in an embodiment, which includes a first magnetometer (e.g., magnetometer 232, FIG. 2) configured to sense the intensity of a magnetic field along the x-axis 110, a second magnetometer (e.g., magnetometer 233, FIG. 2) configured to sense the intensity of a magnetic field along the y-axis 112, and a third magnetometer (e.g., magnetometer 234, FIG. 2) configured to sense the intensity of a magnetic field along the z-axis 114. Alternatively, device 100 may include a one-axis or a two-axis magnetometer, or no magnetometer at all. Device 100 may include one or more additional or different types of sensors, as well (e.g., pressure sensors, temperature sensors, chemical sensors, and so on). As used herein, the term "sense," when referring to an action performed by a transducer, means that the transducer produces an electrical signal indicating the magnitude of an acceleration, a force or a field impinging upon the transducer, or the rate of an angular acceleration (rotation) experienced by the transducer.

Figure 2:
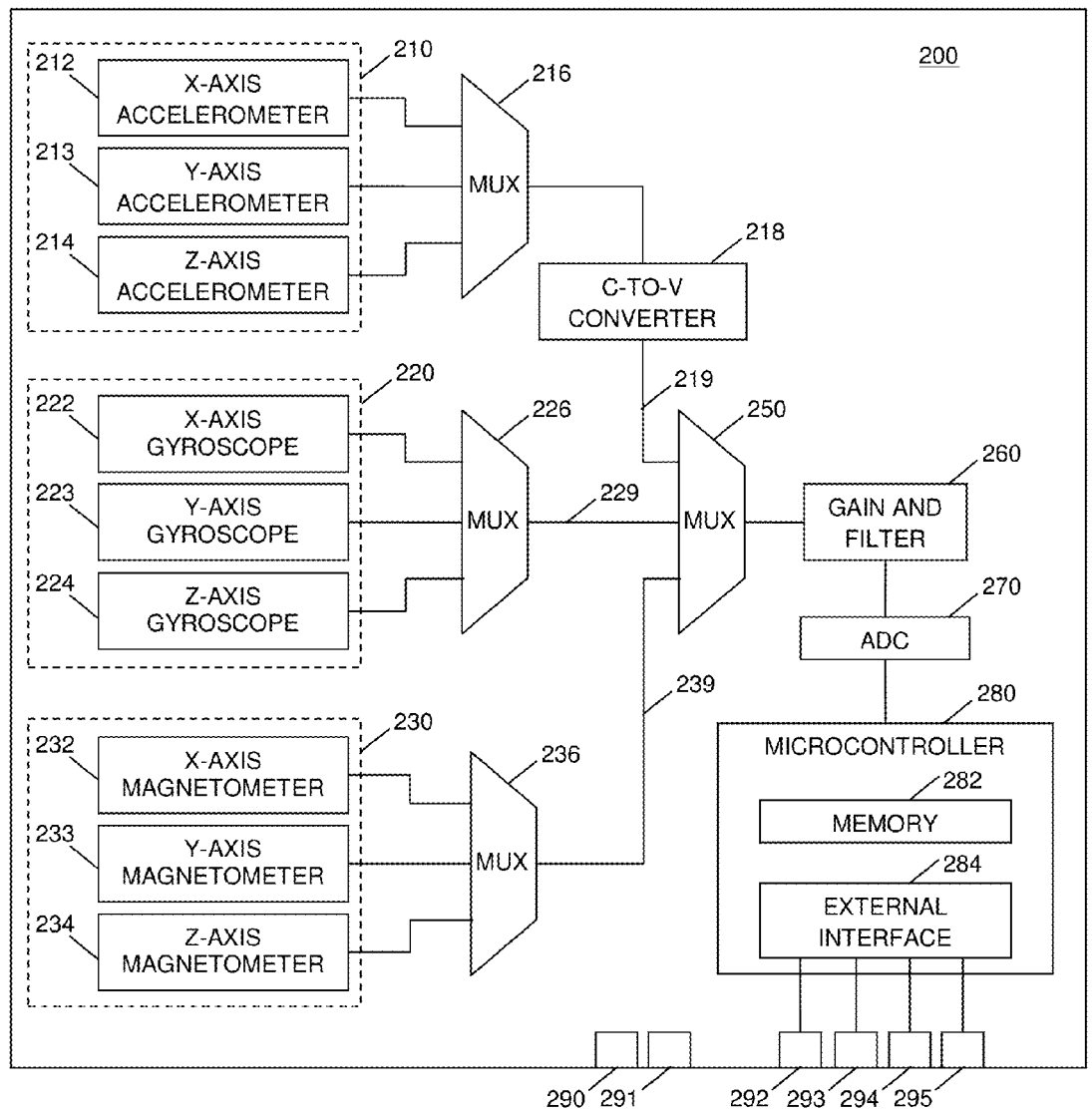
FIG. 2 is a simplified block diagram of a device that includes multiple transducers, in accordance with an example embodiment.

FIG. 2 is a simplified block diagram of a device 200 that includes multiple transducers 212-214, 222-224, 232-234, in accordance with an example embodiment. More specifically, device 200 includes a three-axis accelerometer 210, a three axis gyroscope 220, and a three axis magnetometer 230, in an embodiment. Accelerometer 210 includes x-axis accelerometer 212 configured to sense the magnitude of acceleration (e.g., due to gravity) along an x-axis of the device 200 (e.g., x-axis 110, FIG. 1), y-axis accelerometer 213 configured to sense the magnitude of acceleration (e.g., due to gravity) along a y-axis of the device 200 (e.g., y-axis 112, FIG. 1), and z-axis accelerometer 214 configured to sense the magnitude of acceleration (e.g., due to gravity) along a z-axis of the device 200 (e.g., z-axis 114, FIG. 1). Accelerometers 210 may function to measure static acceleration (e.g., for quantifying the tilt angles experienced by device 200) and/or dynamic accelerations (e.g., for quantifying dynamic acceleration of device 200 in a particular direction). According to alternate embodiments, device 200 may include only a subset of accelerometers 212-214, or may have no accelerometer at all. Gyroscope 220 includes x-axis gyroscope 222 configured to sense the rate of rotation around the x-axis of the device 200, y-axis gyroscope 223 configured to sense the rate of rotation around the y-axis of device 200, and z-axis gyroscope 224 configured to sense the rate of rotation around the z-axis of device 200. According to alternate embodiments, device 200 may include only a subset of gyros 222-224, or may have no gyroscope at all. Magnetometer 230 includes x-axis magnetometer 232 configured to sense the intensity of a magnetic field along the x-axis of the device 200, y-axis magnetometer 233 configured to sense the intensity of a magnetic field along the y-axis of the device, and z-axis magnetometer 234 configured to sense the intensity of a magnetic field along the z-axis of the device 200. According to alternate embodiments, device 200 may include only a subset of magnetometers 232-234, or may have no magnetometer at all. Device 200 may include one or more additional or different types of sensors, as well (e.g., pressure sensors, temperature sensors, chemical sensors, and so on).

According to an embodiment, device further includes multiplexers 216, 226, 236, 250 (MUXs), gain and filter circuitry 260, analog-to-digital converter 270 (ADC), and microcontroller 280 (or another suitable control and/or processing component). Microcontroller 280 may include memory 282 (e.g., data and instruction registers, Flash memory, read only memory (ROM), and/or random access memory (RAM)), although all or portions of memory 282 may be external to microcontroller 280, as well. Memory 282 may be used to store a variety of types of persistent and temporary information or data, such as executable software instructions (e.g., instructions associated with implementation of the various embodiments), data (e.g., data generated based on transducer output signals ("transducer data" herein), configuration coefficients, and so on), device parameters, and so on. Further, microcontroller 280 may include an external interface 284, which is configured to facilitate communication between microcontroller 280 and an external electrical system (not illustrated in FIG. 2) through conductive contacts 292, 293, 294, 295 exposed at an exterior of device 200. For example, external interface 284 may include a Serial Peripheral Interface (SPI), an Inter-Integrated Circuit (I²C), another type of interface, or a combination of various types of interfaces. Device 200 may further include conductive contacts 290, 291 configured to convey voltage references (e.g., power and ground) to various nodes and/or internal electrical components of device 200. Although six contacts 290-295 are illustrated in FIG. 2 for purpose of example, it should be understood that device 200 may include more or fewer contacts 290-295.

Under control of microcontroller 280, MUXs 216, 226, 236, 250 enable one signal at a time to be selected from accelerometers 212-214, gyroscopes 222-224, and magnetometers 232-234, and provided to gain and filter circuitry 260. Gain and filter circuitry 260 is configured to apply a pre-determined gain to the selected signal (e.g., as specified by a gain value or code selected during a calibration process), and to filter the signal in order to eliminate spurious, out-of-band signal components, to filter out signal components caused by undesired mechanical vibrations, and/or to filter out electrical noise (e.g., from other circuitry of device 200). The resulting analog signal is provided to ADC 270, which samples the analog signal and converts the samples into a sequence of digital values. Each digital value indicates the magnitude of an acceleration, a force or a magnetic field impinging upon the device 200 (e.g., when the value corresponds to a signal from the accelerometer 210 or gyroscope 220, respectively), or the rate of acceleration around an axis (e.g., when the value corresponds to a signal from the magnetometer 230).

According to an embodiment, and as will be explained in more detail later, based on commands received via one or more contacts 292-295 (e.g., from calibration controller 310, FIG. 3), microcontroller 280 participates in a calibration process in which microcontroller 280 selects a particular transducer output (e.g., via MUXs 216, 226, 236, 250) and stores digital values corresponding to the transducer output in memory 282. In addition, microcontroller 280 processes the stored digital values to determine calibration coefficients (e.g., gain and offset values or codes) for the transducers 212-214, 222-224, 232-234. Microcontroller 280 also stores the calculated calibration coefficients in memory 282, according to an embodiment. Ultimately, during normal operation of the device 200 (e.g., after incorporation of device 200 into a larger electrical system), the gain values or codes determined during the calibration process are retrieved from memory 282 and used to set the pre-determined gain applied by the gain and filter circuitry 260. In addition, the offset values or codes determined during the calibration process are retrieved from memory 282 and used to set 0 G readings to a target value during normal operation.

Accelerometers 212-214 may be MEMS accelerometers, for example. Typically, a MEMS accelerometer includes a mass with a first electrode, which is suspended over a second electrode that is fixed with respect to the accelerometer substrate. The first electrode, the second electrode, and the air gap between the first and second electrodes form a capacitor, and the value of the capacitor is dependent upon the distance between the first and second electrodes (i.e., the width of the air gap). As the mass is acted upon by an external force (e.g., gravitational force), the first electrode may move closer to or farther from the second electrode, and thus the capacitance value may decrease or increase, accordingly. Other accelerometer configurations also are possible, including configurations in which signals indicating multiple capacitances are generated. According to an embodiment, each accelerometer 212-214 produces an electrical signal indicating the value of such capacitance(s).

According to an embodiment, device 200 includes MUX 216, as mentioned previously, and further includes capacitance-to-voltage (C-to-V) converter 218. The electrical signals indicating the capacitance values associated with accelerometers 212-214 are provided to MUX 216, which may selectively provide one of the signals to C-to-V converter 210 based on a control signal from microcontroller 280. C-to-V converter 218 is configured to convert the capacitance value into a voltage signal on line 219, where the voltage signal has a magnitude that is proportional to the capacitance value associated with the accelerometer 212-214 selected by MUX 216. In an alternate embodiment, device 200 may include a C-to-V converter for each accelerometer 212-214, and a MUX instead could be used to select a voltage signal output from one of the C-to-V converters.

Gyroscopes 222-224 may be MEMS gyroscopes, for example. Typically, a MEMS gyroscope includes a moving mass with an electrode ("movable electrode"), which is suspended adjacent to a second electrode ("fixed electrode") that is fixed with respect to the gyroscope substrate. When the substrate is rotated about an axis perpendicular to the direction of motion of the moving mass, the mass experiences a force in the third orthogonal direction of magnitude 2 mvΩ, where m is the mass, v the velocity, and Ω is the rotation rate. A displacement due to this force will occur, which is dependent on the spring constant of the suspension of the moving mass. The fixed electrode is placed so that the distance between the fixed and movable electrodes will change due this motion. The force may be calculated from the change in distance by measuring capacitance, for example, and the rotation rate may then be calculated from the expression for the force. The mass, m, is known by design, and the velocity, v, is determined from the conditions set up for the movable mass and the design of its suspension, which includes electrodes to drive the movable mass into resonance by application of sinusoidal voltages. In alternative types of gyroscopes, rather than utilizing a mass that moves in a straight line, an oscillating disk may be used. The oscillating disk will respond to substrate rotations perpendicular the disk axis of rotation according to the right hand rule A×Ω, where A is along the disk axis of rotation, and Ω is along the substrate rotation direction. Electrodes beneath the disk can be positioned to measure separation between the disk and substrate to allow calculations of substrate rotation rate that are similar to the calculations discussed above for the linear case. Other gyroscope configurations also are possible.

According to an embodiment, device 200 includes MUX 226, as mentioned previously. The electrical signals from gyroscopes 222-224 are provided to MUX 226, which may selectively provide one of the signals to MUX 250.

Magnetometers 232-234 may be implemented using Hall effect devices, magnetic film devices such as anisotropic magneto resistance (AMR) devices, giant magneto resistance devices (GMR), spin valves, tunnel junction devices (MTJ), Lorentz force devices, or other types of magnetometer devices, in various embodiments. Hall devices rely on the deflection of carriers flowing along a resistive element to form a potential in a direction perpendicular to the flow. This voltage is given by $V=IB/(ned)$, where I is the current, B is the magnetic field strength, n is the carrier concentration, e is the electronic charge, and d is the thickness of the resistive layer. AMR, GMR, spin-valve, and MTJ devices rely on the change in resistance of the structures as function of the strength of a magnetic field relative to a preferred direction for lowest resistance. AMR devices can include films of one magnetic material, for example. GMR devices consist of stacks of metal films, for example, one magnetic film on top, one non-magnetic film in the middle, and another magnetic film on the bottom. Current flow laterally along the stack produces a high resistance due to the magnetic layers being oriented anti-parallel by the magnetic field of the current. This produces more scattering at the interfaces and therefore higher resistance. Application of an external magnetic field overcomes the field of the current, producing a parallel alignment of the magnetizations and lower resistance. In the case of a spin valve, one of the layers has a magnetization that is fixed in direction. MTJ devices are similar to spin valves, except that the non-magnetic layer is insulating and current flow is by tunneling through the insulating junction. The magnetic layers may themselves consist of stacks of varying compositions. To facilitate measurements, magnetic sensing elements are often arranged in bridge configurations. Lorentz force devices rely on the force exerted by an external magnetic field on a current carrying element such as a wire or coil. By using MEMS structures that can move an amount proportional to the applied force, the strength of the external field can be calculated. Such MEMS structures are typically driven by an alternating current at the resonant frequency of the structure to increase the movement and hence increase sensitivity. In one additional type of magnetic sensor device, a permanent magnetic layer is substituted for the conductive element, and displacement of the structure occurs due to torque produced by an external field. Displacement of these structures may be measured by capacitive sensing or by strain gauges.

According to an embodiment, device 200 includes MUX 236, as mentioned previously. The electrical signals from magnetometers 232-234 are provided to MUX 236, which may selectively provide one of the signals to MUX 250.

MUX 250 is configured to select, based on a control signal from microcontroller 280, one of the received inputs on lines 219, 229, 239 for provision to gain and filter circuitry 260. Although a particular configuration of multiplexers is illustrated in FIG. 2 to allow selection of a signal from a particular one of transducers 212-214, 222-224, 232-234, is it to be understood that other multiplexer configurations and circuitry could provide the same functionality, including a configuration that includes a single multiplexer that receives and selects from output signals from all of the transducers 212-214, 222-224, 232-234.

As indicated above, microcontroller 280 is configured to communicate with an external electrical system. According to a particular embodiment, after fabricating device 200, device 200 may be installed in a device calibration system (e.g., system 300, FIG. 3) for the purpose of calibrating device 200 (e.g., calculating gain and offset values or codes). In conjunction with the calibration process, microcontroller 280 may receive one or more commands from the calibration system that cause microcontroller 280 to select transducer outputs, store digital values corresponding to the transducer outputs, calculate device calibration coefficients (e.g., gain and offset values or codes) based on the stored digital values, and store the device calibration coefficients.

Various embodiments of device calibration systems and methods of calibrating a plurality of devices will now be described. Some of the embodiments may be used to calibrate devices such as those discussed above in conjunction with FIG. 2. Other embodiments may be used to calibrate devices that are different in configuration from the embodiments discussed in conjunction with FIG. 2. For example, but not by way of limitation, various embodiments may be used to calibrate devices that do not include a microcontroller (e.g., microcontroller 280) and/or internal memory (e.g., memory 282). In such cases, an embodiment of a calibration system may receive digital sensor outputs directly, and may calculate the device calibration coefficients based on the received sensor outputs. In an embodiment in which a device includes internal memory, the calibration system may cause the device calibration coefficients to be stored on the device. Otherwise, the device calibration coefficients may later be stored in a memory device of an electronic system into which the device ultimately is incorporated.

Figure 3:
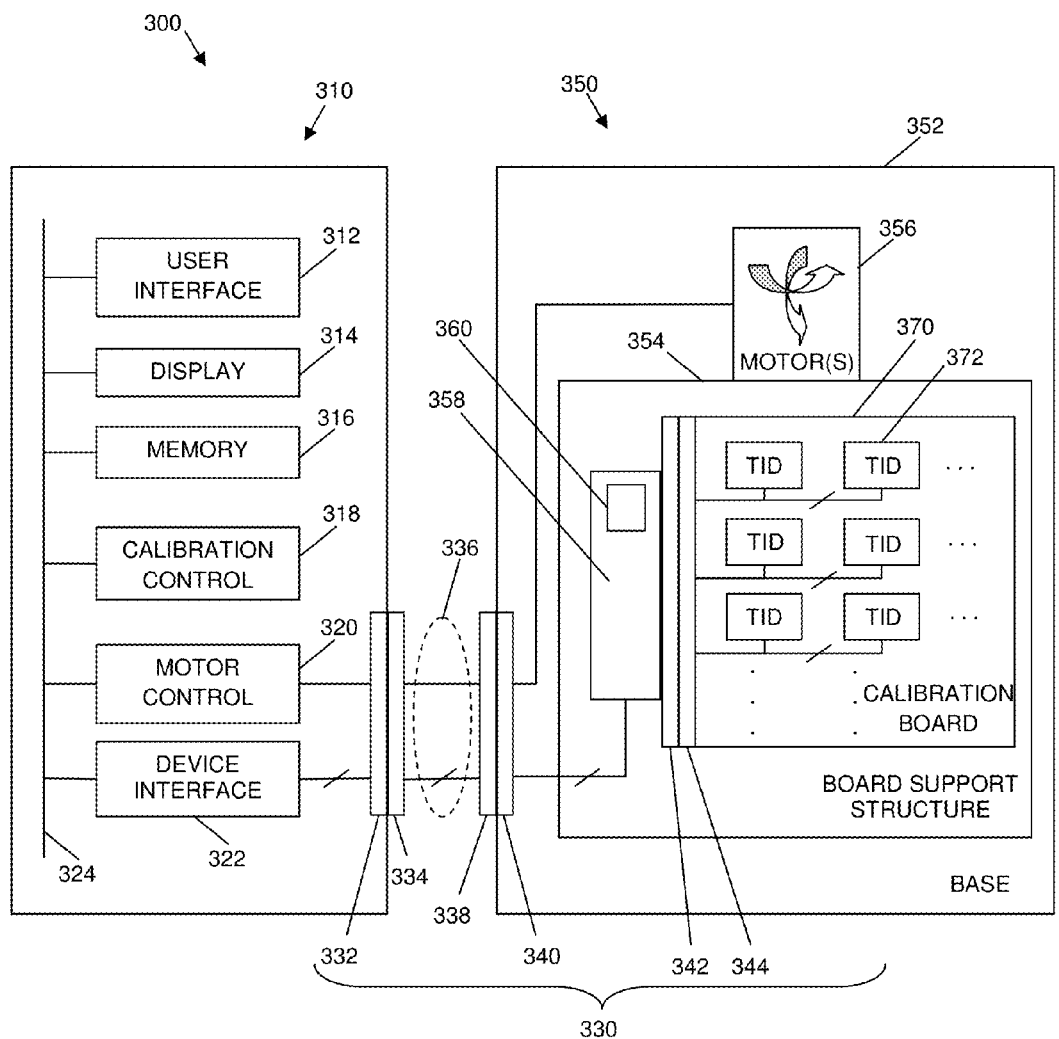
FIG. 3 is a simplified block diagram of a device calibration system, in accordance with an example embodiment.

FIG. 3 is a simplified block diagram of a device calibration system 300, in accordance with an example embodiment. Calibration system 300 includes a calibration controller 310, a device handling system 350, and one or more calibration boards 370. As will be discussed in more detail below, each calibration board 370 includes a plurality of sockets (e.g., sockets 420, FIG. 4) within which a plurality of transducer-including devices 372 ("TIDs") may be inserted. The calibration board sockets also include conductive contacts configured to electrically connect with corresponding contacts of the transducer-including devices 372. More particularly, the socket contacts are coupled with conductors on the calibration board 370, and the conductors on the calibration board 370 ultimately are coupled with a communication structure 330 that enables communication between the transducer-including devices 372 and the calibration controller 310. Although only one calibration board 370 is shown in FIG. 3, a system may include multiple calibration boards, which may be supported by a single board support structure, as described below. In addition, to increase parallel manufacturing capabilities, a system may include multiple device handling systems 350.

According to an embodiment, under the control of calibration controller 310, the device handling system 350 transitions the calibration board 370 (and thus the transducer-including devices 372) through a series of physical orientations. During this process, the calibration controller 310 communicates with the transducer-including devices 372 in order to cause each transducer-including device 372 to sense magnitudes of accelerations, fields or forces with respect to one or more device-fixed axes (e.g., axes 110, 112, 114, FIG. 1) and/or to sense rate of rotation around one or more device-fixed axes. In addition, in an embodiment, the calibration controller 310 also causes each transducer-including device 372 to calculate calibration coefficients (e.g., gain and offset values or codes) and to store the calibration coefficients in a memory of the transducer-including device 372 (e.g., memory 282, FIG. 2).

In order for communication between the calibration controller 310 and the transducer-including devices 372 to occur, system 300 also includes a communication structure 330. In an embodiment, the communication structure 330 includes a plurality of conductors and connectors, which enable communication of various signals and voltage references (e.g., power and ground) between the calibration controller 310 and the transducer-including devices 372. For example, in an embodiment, the communication structure 330 may include a first structure that electrically interconnects the calibration controller 310 and the device handling system 350. For example, the first structure may include a first, multi-conductor connector 334, a plurality of conductive lines 336, and a second, multi-conductor connector 338. The first structure may be in the form of a flexible, multi-conductor cable with connectors 334, 338 on either end of the cable, for example. The connector 334 on one end of the cable may be configured to mate with a corresponding, multi-conductor connector 332 of the calibration controller 310, and the connector 338 on the other end of the cable may be configured to mate with a corresponding, multi-conductor connector 340 of the device handling system 350. Additional conductors and connectors (e.g., connectors 342, 344) of the device handling system 350 and the calibration board 370 may complete the communication structure 330, thus enabling the calibration controller 310 to communicate with the transducer-including devices 372. Although an example of a communication structure 330 is illustrated in FIG. 3 and described herein, it is to be understood that an alternate embodiment may include any suitable communication structure, including but not limited to a communication structure that includes one or more wireless communication links. Thus, the given example should not be construed as limiting.

According to an embodiment, the device handling system 350 includes a base 352, a rotatable board support structure 354, one or more motors 356, a first connector 340 configured to electrically interface with the calibration controller 310 (e.g., via one or more additional connectors 332, 334, 338 and conductive lines 336), a second connector 342 configured to electrically interface with the calibration board 370 (e.g., via a corresponding connector 344 of the calibration board 370), and a plurality of conductors (not numbered) between the first and second connectors 340, 342. In addition, in an embodiment, the device handling system 350 may include a circuit board 358 electrically coupled to the second connector 342. The circuit board 358 may include a microcontroller 360 (or other suitable control and/or processing component), a memory (not illustrated), and/or other components. In addition, in another embodiment, the device handling system 350 also may include a magnetic field generator (not illustrated) configured to produce a magnetic field that passes through the board support structure 354. The magnetic field generator may be activated prior to calibrating the transducer-including devices 372 (or more specifically, prior to calibrating magnetometers of the transducer-including devices 372). Alternatively, the Earth's magnetic field may be used to calibrate magnetometers of the transducer-including devices 372.

The base 352 is configured to support one or more of the motor(s) 356 in a fixed position, and to support the board support structure 354 in a manner that enables the board support structure 354 to be rotated around one or more axes by the motor(s) 356, in an embodiment. According to another embodiment, a first motor 356 that is mounted to the base 352 may be used to change the orientation of a second motor 352 (e.g., a two-axis gimbal structure may be used to enable two motors 356 to rotate the board support structure 354 around multiple axes).

According to an embodiment, the board support structure 354 is configured to hold the calibration board 370 in a fixed position with respect to itself. Accordingly, as the board support structure 354 is rotated by the motor(s) 356, the calibration board 370 also is rotated by the same angle. Further, when transducer-including devices 372 are installed in the sockets of the calibration board 370, the transducer-including devices 372 also are rotated by the same angle. In other words, the device handling system 350 is configured simultaneously to rotate the board support structure 354, calibration board 370, and transducer-including devices 372 around one or more axes. At any given time, the orientation of the board support structure 354 defines the orientations of the calibration board 370 and the transducer-including devices 372.

As mentioned above, the device handling system 350 includes a connector 342, which is configured to electrically interface with a corresponding connector 344 of the calibration board 370. According to an embodiment, connectors 342, 344 are held together by the force of friction, and a human operator may readily install calibration board 370 into the device handling system 350 by aligning the connector 344 of the calibration board 370 with the connector 342 of the device handling system 350, and pushing the calibration board 370 toward connector 342 using a reasonable pressure applied to the calibration board 370 (i.e., the calibration board 370 is configured to be coupled with the board support structure 354 by connecting the connectors 342, 344 using a reasonable force). In another embodiment, the calibration board connection operation may be performed by an automated board-handling system without the intervention of a human operator (e.g., an automated board-handling system may pick up the calibration board 370 and load it into the device handling system 350). Either way, once connectors 342, 344 are firmly mated, electrical connections are established between the calibration controller 310 and transducer-including devices 372 installed in the sockets of the calibration board 370. A calibration process may thereafter be performed, as described in more detail below. After completion of the calibration process, the human operator (or an automated board-handling system) may thereafter remove the calibration board 370 from the device handling system 350 by pulling the calibration board 370 away from connector 342 using a reasonable force (i.e., the calibration board 370 is configured to be removed from the board support structure 354 by disconnecting the connectors 342, 344 using a reasonable force).

Figure 4:
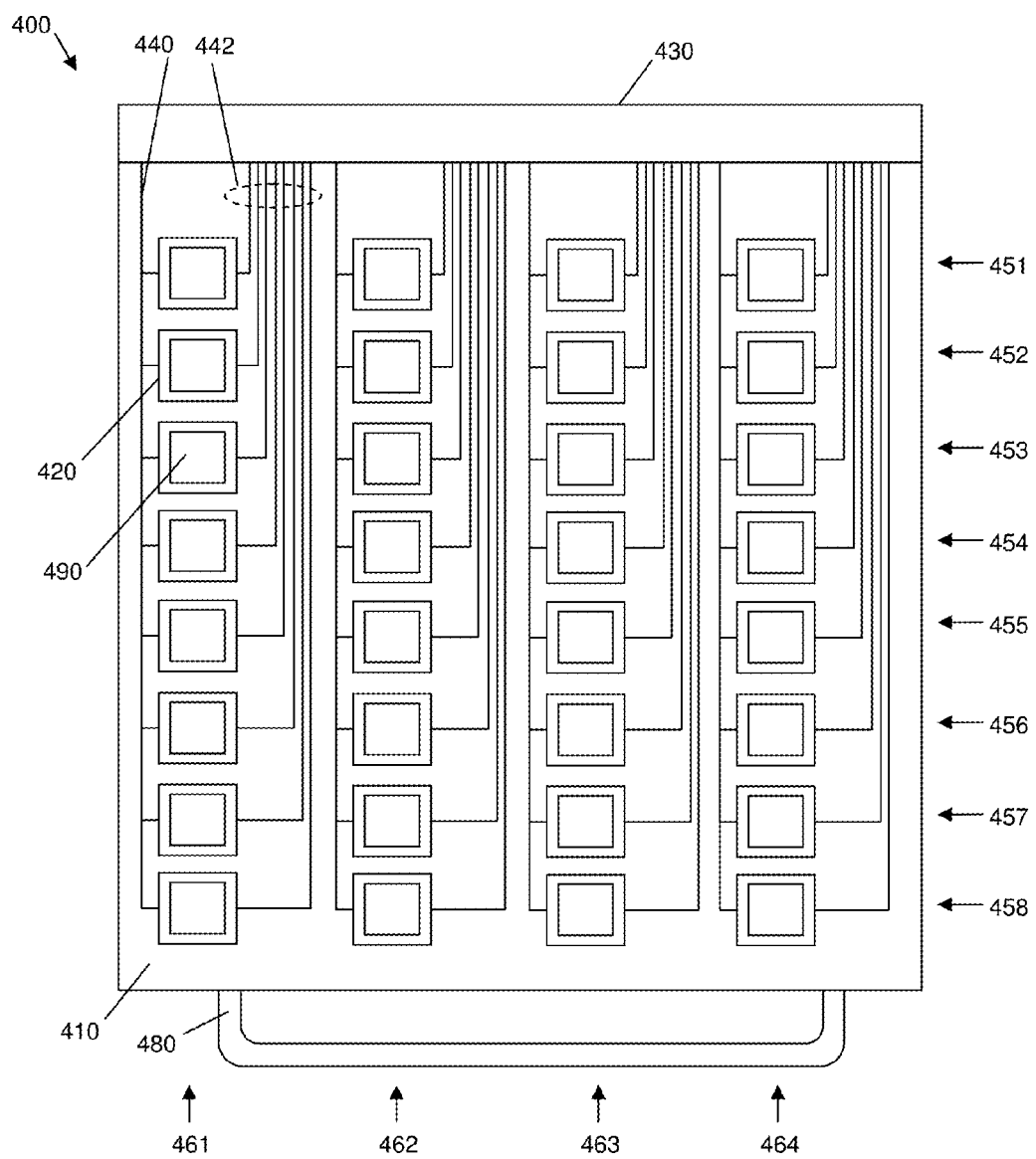
FIG. 4 is a top view of a calibration board with a plurality of transducer-including devices installed in sockets of the calibration board, in accordance with an example embodiment.

FIG. 4 is a top view of a calibration board 400 (e.g., calibration board 370, FIG. 3) with a plurality of transducer-including devices 490 (e.g., transducer-including devices 372, FIG. 2) installed in a plurality of sockets 420 of the calibration board 400, in accordance with an example embodiment. Calibration board 400 includes a substrate 410, a plurality of sockets 420 coupled to the substrate 410, an edge connector 430 (e.g., connector 344, FIG. 3), a plurality of conductors 440, 442 between the sockets 420 and the connector 430, and a handle 480, in an embodiment. Although handle 480 is not essential, handle 480 may be included for the convenience of a human operator who is responsible for inserting calibration board 400 into a device handling system (e.g., device handling system 350, FIG. 3) and removing calibration board 400 from the device handling system.

Each socket 420 is configured to hold a transducer-including device 490, and to provide for electrical connection between the transducer-including device 490 and conductors 440, 442. More specifically, each socket 420 is designed so that, when a transducer-including device 490 is installed in the socket 420, contacts of the transducer-including device 490 (e.g., contacts 290-295, FIG. 2) align and physically connect with corresponding contacts (not illustrated) of the socket 420. According to an embodiment, calibration board 400 includes an array of sockets 420 arranged in rows 451, 452, 453, 454, 455, 456, 457, 458 and columns 461, 462, 463, 464. Although an array of sockets with eight rows 451-458 and four columns 461-464 is shown in FIG. 4, it is to be understood that alternate embodiments of calibration boards may include more or fewer rows and/or columns of sockets, including as few as a single row or a single column. Accordingly, although a calibration board 400 configured to hold 32 transducer-including devices 490 is shown in FIG. 4, it is to be understood that a calibration board may be designed to hold more or fewer transducer-including devices. Either way, according to an embodiment, each socket 420 may be identified by the row and column in which it is positioned. Alternatively, each socket 420 may be identified by some other unique identifier that enables a calibration system (e.g., calibration control module 310 of calibration system 300, FIG. 3) to store information (e.g., error information, state information, transducer data, calibration coefficients, and so on) relating to a particular transducer-including device 490 installed in a particular socket 420 using the unique socket identifier as a key.

Each conductor 440, 442 extends between a socket contact and a conductive element of connector 430 (e.g., a pin or pin receptacle, which is configured to mate with a corresponding pin receptacle or pin, respectively, of another connector, such as connector 342, FIG. 3). Certain ones of conductors 440 may be connected in parallel to corresponding contacts of sockets 420 within a given column 461-464 or with corresponding contacts of all sockets 420 of the calibration board 400. These conductors 440 may be referred to herein as "multiple socket conductors" 440. According to an embodiment, a signal or voltage reference conveyed on a multiple socket conductor 440 is conveyed simultaneously to all sockets 420 to which the parallel conductor 440 is coupled (and to all transducer-including devices 490 installed in those sockets 420). Certain other conductors 442 may be connected to a contact of only one socket 420. These conductors 442 may be referred to herein as "single socket conductors" 442. According to an embodiment, a signal conveyed on a single socket conductor 442 is conveyed to or by only a single transducer-including device 490 installed in a single socket 420. In FIG. 4, only one multiple socket conductor 440 and one single socket conductor 442 are shown as being coupled to each socket 420 to avoid cluttering the Figure. However, according to various embodiments, a plurality of multiple socket conductors 440 and/or single socket conductors 442 may be coupled to each socket 420, with each conductor 440, 442 being coupled to a particular socket contact (corresponding to a particular contact of a transducer-including device 490). According to an embodiment, voltage references corresponding to power and ground are conveyed using multiple socket conductors 440. Other signals may be conveyed using multiple socket conductors 440 or single socket conductors 442, as will be described in more detail below.

Figure 6:
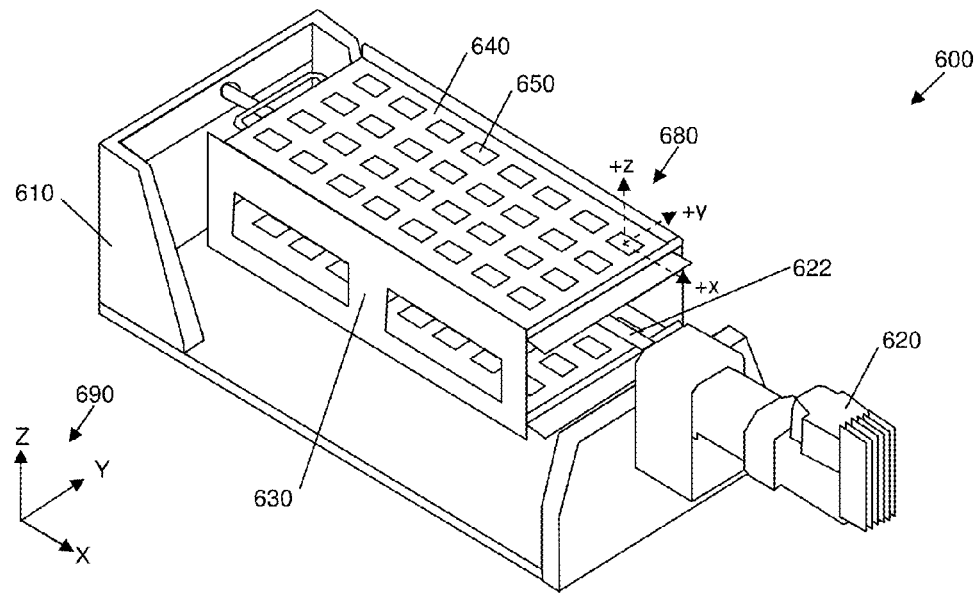
FIG. 6 is an external view of a device handling system, which includes a board support structure that is oriented in a first orientation with respect to a fixed coordinate system, in accordance with an example embodiment.

Referring again to FIG. 3, according to an embodiment, the device handling system 350 includes a single motor 356 coupled to the board support structure 354 in a manner that enables the motor 356 to rotate the board support structure 354 around one axis (e.g., X-axis of fixed coordinate system 690, FIG. 6). In another embodiment, the device handing system 350 includes multiple motors 356 coupled to the board support structure 354 in a manner that enables the motors 356 to rotate the board support structure 354 around multiple axes (e.g., multiple orthogonal axes of a fixed coordinate system). Although much of the description herein discusses an embodiment in which a single motor 356 rotates the board support structure 354 around a single axis, those of skill in the art would understand, based on the description herein, how to modify system 300 so that the board support structure 354 could be rotated around multiple axes.

As mentioned above, motor(s) 356 are controlled by signals from calibration controller 310 (e.g., signals conveyed via communication structure 330). Communication between calibration controller 310 and motor(s) 356 may be one-way (e.g., calibration controller 310 may send signals or commands to motor(s) 356 to rotate a specified number of degrees, for a specified time period, and/or at a specified rate) or communications may be bi-directional (e.g., motor(s) 356 also may send feedback to calibration controller 310 indicating an angular orientation, a rate of rotation, and so on). In addition, calibration controller 310 communicates with transducer-including devices 372 (e.g., via communication structure 330) to cause transducer-including devices 372 to generate transducer data and, in an embodiment, to calculate and store calibration coefficients. Communication between calibration controller 310 and transducer-including devices 372 is bi-directional, in an embodiment. More specifically, as will be described later, calibration controller 310 may send various commands to the transducer-including devices 372 (e.g., via parallel conductors of communication structure 330, where parallelism is indicated with a forward slash in FIG. 3), and the transducer-including devices 372 may send signals to calibration structure 310 indicating certain events and/or data. The transducer-including devices 372 also may receive voltage references (e.g., power and ground) through one or more conductive paths (e.g., through communication structure 330 and/or from voltage references supplied by the device handling system 350).

In an embodiment, calibration controller 310 includes a user interface 312, a display device 314, memory 316, a calibration control module 318, a motor control module 320, and a transducer-including device interface 322. The various components of calibration controller 310 may communicate over a common bus structure 324, as shown in FIG. 3, or may communicate over multiple busses and/or other conductive paths. In addition, although the various components of calibration controller 310 may be housed together in a single housing, the various components of calibration controller 310 alternatively may be housed in multiple housings, with appropriate connectors between the various components.

The user interface 312 includes one or more devices, which enable a human operator to interact with the system 300. For example, the user interface 312 may include any combination of a key panel, a button panel, a keyboard, a cursor control device, a touch sensitive screen, a speaker, a microphone, and so on. Display device 314 enables the system 300 to provide the human operator with information (e.g., prompts, data, calibration process status updates, and so on). Through user interface 312 and display device 314, the human operator may initiate, control, and monitor a calibration process. Alternatively, initiation, control, and monitoring of a calibration process may be performed using an automated system.

Memory 316 may include any combination of RAM, ROM, or other type of memory. According to an embodiment, memory 316 may be used to store a variety of types of persistent and temporary information or data, such as executable software instructions (e.g., instructions associated with implementation of the various embodiments), data, system parameters, and so on.

Calibration control module 318 is configured to execute the software associated with implementation of the calibration process, including controlling the motor control module 320 and communicating with the transducer-including devices 372 via device interface 322. For example, according to an embodiment, calibration control module 318 is configured to cause motor control module 320 to send motor control signals to the motor(s) 356 to cause the motors to move the board support structure 354 through a series of orientations with respect to one or more axes (and thus to move the calibration board 370 and transducer-including devices 372 through the series of orientations). In addition, calibration control module 318 is configured to send calibration control signals to the transducer-including devices 372 via the device interface 322 and communication structure 330, in order to cause the transducer-including devices 372 to generate transducer data while the device support structure 354 is in or moving toward each of the series of orientations. Each of these processes will be described in more detail below.

Many of the embodiments discussed herein pertain to calibrating a transducer-including device (e.g., device 200, 372, FIGS. 2, 3) that includes a microcontroller (e.g., microcontroller 280, FIG. 2) and internal memory (e.g., memory 282, FIG. 2), where the microcontroller calculates the calibration coefficients, and the calibration coefficients are stored in the internal memory. In an alternate embodiment, a transducer-including device may not include a microcontroller that calculates the calibration coefficients. In such an embodiment, the transducer-including device may instead provide electronic signals that convey the transducer measurements to the system 300 (e.g., to a microcontroller 360 of the device handling system 350 or to calibration control module 318 of the calibration controller 310), and those components of the system 300 may calculate the calibration coefficients. In another alternate embodiment, a transducer-including device does not store the calibration coefficients in internal memory. Instead, the system 300 may store the calibration coefficients (e.g., in memory 316 of the calibration controller 310), and the calibration coefficients later may be loaded into the memory of a device (e.g., device 1100, FIG. 11) into which a transducer-including device ultimately is incorporated. Accordingly, although various embodiments discussed herein are used to calibrate "intelligent" transducer-including devices (e.g., devices that include a microcontroller and internal memory), other embodiments may be used to determine calibration coefficients for "unintelligent" transducer-including devices (e.g., devices that do not include a microcontroller and/or internal memory).

In yet another alternate embodiment, all or portions of the calibration controller 310 may be coupled to the board support structure 354. For example, in an embodiment, circuit board 358 may have components corresponding to all or portions of the calibration controller 310. More particularly, those components may be configured to implement all or portions of the processes performed by user interface 312, display 314, memory 316, calibration control module 318, motor control module 320, and/or device interface 322. In a further embodiment, the portions of the calibration controller 310 that are coupled to the board support structure 354 (e.g., that are coupled to circuit board 358) may communicate wirelessly with portions of the calibration controller 310 that are not coupled to circuit board 358. Such embodiments may be particularly useful, for example, when it is desired to rotate the board support structure 354 in a manner in which physical conductors of communication structure 330 (e.g., cables) otherwise may become undesirably wound up (e.g., when it is desired to rotate the board support structure 354 through multiple full rotations, such as when calibrating gyroscopes 220, FIG. 2).

Figure 5:
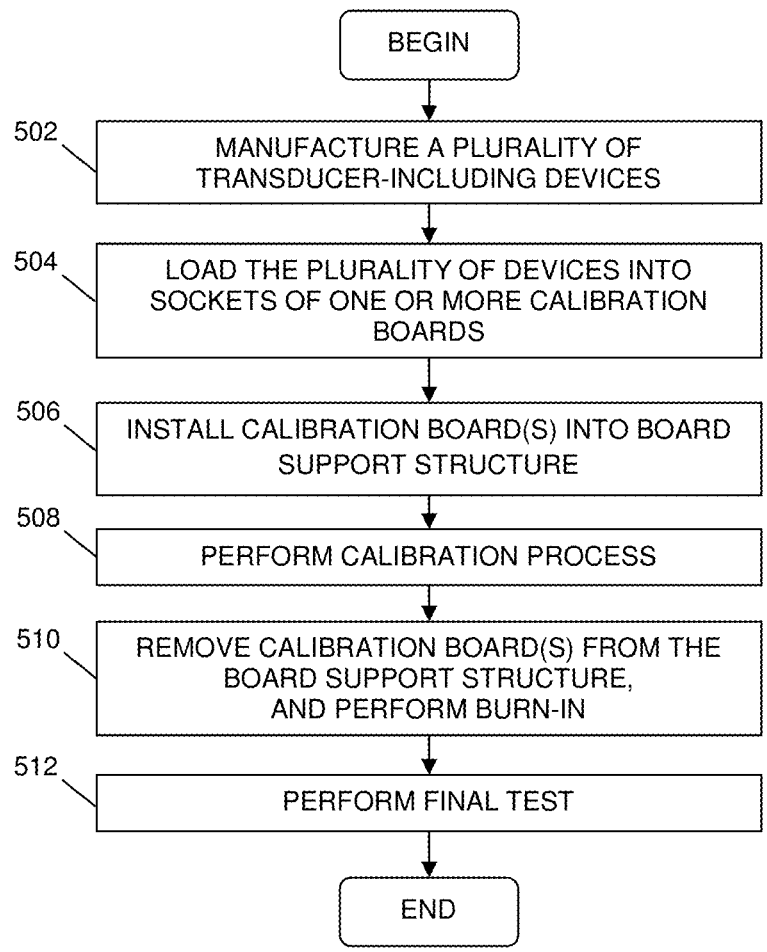
FIG. 5 is a flowchart of a method for manufacturing and calibrating a plurality of transducer-including devices, in accordance with an example embodiment.

The calibration system 300 may be used to calibrate a plurality of transducer-including devices 372 at various points in a manufacturing process. For example, FIG. 5 is a flowchart of a method for calibrating a plurality of transducer-including devices at a particular point in a manufacturing process, in accordance with an example embodiment. It is to be understood that a calibration system (e.g., calibration system 300, FIG. 3) alternatively may be used at a different point in a manufacturing process than that described in conjunction with FIG. 5.

In any event, according to an embodiment, the method may begin by manufacturing a plurality of transducer-including devices (e.g., transducer-including devices 100, 200, 372, 490, FIGS. 1-4), in block 502. The transducer-including devices essentially are fully packaged devices (e.g., overmolded or air cavity packages) with exposed contacts (e.g., contacts 108, FIG. 1). In block 504, the plurality of transducer-including devices is loaded into sockets (e.g., sockets 420, FIG. 4) of one or more calibration boards (e.g., calibration board 400, FIG. 4). For example, the devices may be loaded into the sockets by hand, using automatic pick-and-place equipment, or using some other technique.

In block 506, a human operator (or automated board-handing system) installs the calibration board(s) into a board support structure of a device handling system (e.g., into board support structure 354 of device handling system 350, FIG. 3). For example, as discussed previously, an edge connector of the calibration board (e.g., edge connector 344, 430, FIGS. 3, 4) may be aligned with a corresponding connector of a device handling system (e.g., connector 342, FIG. 3), and the connectors may be pushed together until electrical connection is established between the connectors' conductive features.

According to an embodiment, the board support structure is coupled with a base (e.g., base 352, FIG. 3) and with one or more motors (e.g., motors 356, FIG. 3), which are configured to support the board support structure and to rotate the board support structure around one or more axes, respectively. For example, FIG. 6 is an external view of a device handling system 600, which includes a base 610, a motor 620, and a board support structure 630 that is oriented in a first orientation with respect to a fixed coordinate system 690 (e.g., a coordinate system that is fixed with respect to base 610), in accordance with an example embodiment. In the embodiment illustrated in FIG. 6, board support structure 630 is configured to hold two calibration boards 640, and each calibration board 640 may include a plurality of transducer-including devices 650 loaded into sockets of the calibration boards 640. In other embodiments, a board support structure may be configured to hold a single calibration board or more than two calibration boards. Either way, in the orientation of FIG. 6, the device-fixed axes 680 of each transducer-including device 650 are angularly offset from the corresponding axes of the fixed coordinate system 690 (although in the orientation of FIG. 6, the angular offsets are approximately zero degrees).

The calibration boards 640 may be coupled to the board support structure 630 using corresponding connectors. For example, an edge connector (e.g., connector 344, 430, FIGS. 3, 4) at a first end of each calibration board 640 may be inserted into a corresponding connector (e.g., connector 342, FIG. 3) that is coupled to the board support structure 630. The connectors and other mechanical features (e.g., slots, ledges, and so on) of the calibration boards 640 and/or the board support structure 630 hold the calibration boards 640 in a fixed position with respect to the board support structure 630.

Conversely, the board support structure 630 is coupled to the base 610 in a manner that enables the board support structure 630 to be rotated by motor 620 around an axis of the fixed coordinate system 690. According to an embodiment, motor 620 is coupled to base 610, and a shaft 622 extending from motor 620 is coupled to the board support structure 630. The motor 620 may be controlled (e.g., by calibration controller 310, FIG. 3) to rotate the shaft 622 and, thus, to rotate the board support structure 630, calibration boards 640, and transducer-including devices 650. In the example of FIG. 6, for example, motor 620 may be controlled to rotate the board support structure 630, calibration boards 640, and transducer-including devices 650 around the X-axis of coordinate system 690. As mentioned previously, according to other embodiments, a system alternatively may include one or more motors that may be controlled to rotate a board support structure and/or calibration board around multiple fixed axes.

Referring again to FIG. 5, in block 508, a calibration process for the transducer-including devices is then performed.

As will be discussed in more detail in conjunction with FIGS. 8-10, the calibration process essentially includes a calibration controller (e.g., calibration controller 310, FIG. 3) causing the motor(s) (e.g., motors 356, FIG. 3) to rotate the board support structure through a series of orientations, causing the transducer-including devices to collect transducer data while in the various orientations (or while being moved between orientations) and, ultimately, causing the transducer-including devices to calculate calibration coefficients based on the collected transducer data. In other words, as discussed previously, the calibration controller causes the transducer-including devices (e.g., devices 650, FIG. 6) and their corresponding device-fixed axes (e.g., axes 680, FIG. 6) to be rotated with respect to a fixed coordinate system (e.g., fixed coordinate system 690, FIG. 6). In addition, the calibration controller communicates with the transducer-including devices to cause the devices to produce transducer data and to calculate calibration coefficients, in an embodiment. For example, referring again to FIG. 6, the calibration controller (not shown in FIG. 6) may communicate with the transducer-including devices 650 to cause the transducer-including devices 650 to generate transducer data while the devices 650 are in the orientation shown in FIG. 6. Assuming that the only significant force is a gravitational force in the −Z direction, for example, a +1 G acceleration due to gravity would be exerted on the transducer-including devices 650 along the device-fixed z-axis, and the transducer data (e.g., accelerometer and/or gyroscope data) produced by the devices 650 would have corresponding values. As mentioned previously, the system also may include a magnetic field generator (not illustrated) configured to produce a magnetic field that passes through the board support structure 630 (e.g., with the magnetic field being strongest along the Z-axis), and the transducer data (e.g., magnetometer data) produced by the devices 650 would have corresponding values.

Figure 7:
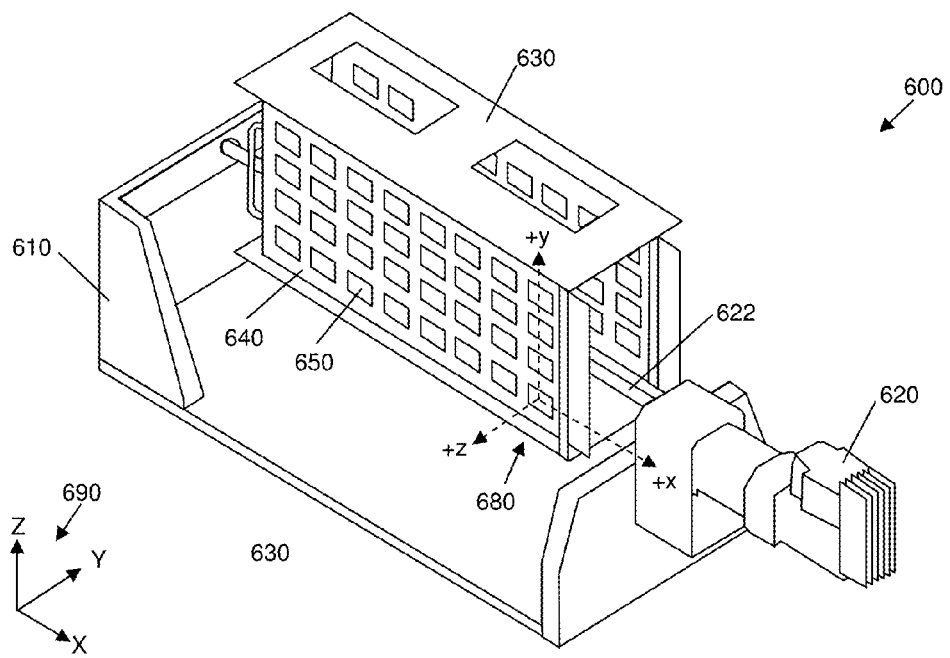
FIG. 7 is an external view of the device handling system of FIG. 6, with the board support structure oriented in a second orientation with respect to the fixed coordinate system, in accordance with an example embodiment.

According to an embodiment, once a transducer-including device 650 has produced transducer data in a particular orientation (e.g., the orientation shown in FIG. 6), the transducer-including device 650 may send an indication to the calibration controller that the measurement (or data collection) process has been completed for that orientation. The calibration controller may then send motor control signals to motor 620, to cause the motor 620 to rotate the board support structure 630 to a next orientation in the sequence. For example, FIG. 7 is an external view of the device handling system 600 of FIG. 6, with the board support structure 630 oriented in a second orientation with respect to the fixed coordinate system 690, in accordance with an example embodiment. More specifically, via motor 620, the board support structure 630 has been rotated approximately 90 degrees around the X-axis of the fixed coordinate system 690. In this orientation, a +1 G acceleration due to gravity would be exerted on the transducer-including devices 650 along the device-fixed y-axis. In this orientation, the calibration controller may cause each transducer-including device 650 again to produce transducer data, and the transducer-including device 650 again may send an indication to the calibration controller that the measurement process in that orientation has been completed. This process may continue until the calibration controller has caused the board support structure 630 to be rotated through a series of desired orientations. When transducer data in the final orientation of the series has been collected, the transducer-including devices 650 may calculate calibration coefficients (e.g., gain and offset values or codes). The calibration coefficients may be stored in memory of the devices (e.g., memory 282, FIG. 2). In alternate embodiments, the transducer-including devices 650 may not calculate and/or store calibration coefficients, in which case these processes would be performed elsewhere (e.g., by microcontroller 360, calibration control module 318, and/or memory 316, FIG. 3).

Referring again to FIG. 5, once the calibration process is complete, the calibration board(s) may be removed from the device handling system, in block 510. The loaded calibration board(s) may then be used to perform other portions of the manufacturing process (e.g., both calibration and additional processes may be performed without removing the transducer-including devices from the calibration board). For example, according to an embodiment, a burn-in process may thereafter be performed with the device-loaded calibration boards. During a burn-in process, for example, the calibration boards may be electrically connected (via connectors 344, 430, FIGS. 3, 4) to corresponding connectors in a chamber. At an elevated temperature and/or pressure, the transducer-including devices may make produce and store additional sensor measurements, verify that the measurements are within expected ranges, and produce indications of the results. Other processes also or alternatively may be performed during a burn-in process.

Subsequently, in block 512, a final test process may be performed. During the final test process, for example, the devices may be tested to ensure that the transducers are still functioning properly. In addition, for embodiments of transducer-including devices that include internal memory (e.g., memory 282 of device 200, FIG. 2), data stored within the device may be read out and evaluated to ensure that the data falls within pre-specified ranges. Upon completion of the final test process, the method may end.

A more detailed example embodiment of a calibration process (e.g., block 508, FIG. 5) will now be given in conjunction with FIGS. 8-10. More specifically, FIG. 8 is a flowchart of a method for calibrating a plurality of transducer-including devices, in accordance with an example embodiment. The method may begin, in block 802, when a human operator causes the calibration process to be initiated (e.g., by pressing a "start" button of the calibration controller user interface 312, FIG. 3). Alternatively, the calibration process may be started automatically (e.g., once the calibration board has been properly loaded into the board support system). Either way, upon initiation of the process, the calibration controller may cause the transducer-including devices to be powered up, in block 804.

According to an embodiment, the calibration controller may then wait to receive "ready" indications from each of the transducer-including devices on a calibration board, in block 806. For example, referring also to FIGS. 3 and 4, each transducer-including device 490 on calibration board 400 may produce a signal at one of its contacts (e.g., one of contacts 292-295, FIG. 2), which corresponds to the ready indication (e.g., the device may establish a relatively-high voltage at the contact). According to an embodiment, the signal corresponding to the ready indicator is conveyed via a socket contact and a single-socket conductor 442 to the calibration board connector 430, and ultimately through the communication structure 330 to the calibration controller 310. In alternate embodiments, the transducer-including device may send a message (e.g., a message packet) to the calibration controller with a payload that indicates that the device is ready, or the device may produce some other type of ready indication. When the calibration controller has not received a ready indication from a particular device within a timeout period, the calibration controller may log an error for that device (e.g., the calibration controller may log an error corresponding to a particular socket).

Once the calibration controller has received the ready indication from all transducer-including devices on a calibration board (and/or has logged errors for non-responsive devices), in block 808, the calibration controller may cause the calibration board to be placed in a first orientation. More specifically, for example, the calibration controller may provide motor control signals (e.g., via motor control module 320), which cause the motor(s) of the device handling system (e.g., motor(s) 356) to move the board support structure, calibration board, and devices (e.g., board support structure 354, calibration board 370, and devices 372) to a first orientation in a pre-defined sequence of orientations. The motor(s) may provide feedback to the calibration controller during this process (e.g., indicating motor position, rate of rotation, and so on). If the board support structure already is in the first orientation at the beginning of the calibration process, the first iteration of block 808 may be bypassed In block 810, the calibration controller may then send a "calibration" command to the devices. For example, according to an embodiment, the calibration controller may send the calibration command to all devices on the calibration board in parallel. According to an embodiment, the calibration command is conveyed by the calibration controller 310 via the communication structure 330 and the calibration board connector 430 to multiple socket conductor(s) 440 of the calibration board 400, which in turn convey the signals to the sockets 420 and the transducer-including devices 490.

According to an embodiment, the calibration command indicates to the transducer-including device (or more specifically to microcontroller 280, FIG. 2) the orientation that the device is in, and/or from which of multiple transducers transducer data should be collected. For example, when testing a multi-axis accelerometer of the device, the calibration command may indicate from which of multiple accelerometers (e.g., which of accelerometers 212-214, FIG. 2) data should be collected. If the orientation is expected to produce a maximum acceleration (e.g., about +1 G of acceleration due to gravity) along the device's z-axis (e.g., z-axis 114, FIG. 1), for example, the calibration command may indicate that that transducer data should be collected from the z-axis accelerometer (e.g., z-axis accelerometer 214, FIG. 2). Accordingly, the device may select the output from that accelerometer (e.g., microcontroller 280 may control MUXs 216, 250 to produce an output from z-axis accelerometer 214, FIG. 2).

Conversely, for example, when testing a multi-axis magnetometer of the device, the calibration command may indicate from which of multiple magnetometers (e.g., which of magnetometers 232-234, FIG. 2) data should be collected. If the orientation is expected to produce a maximum magnetic field along the device's y-axis (e.g., y-axis 112, FIG. 1), for example, the calibration command may indicate that transducer data should be collected from the y-axis magnetometer (e.g., y-axis magnetometer 233, FIG. 2). Accordingly, the device may select the output from that magnetometer (e.g., microcontroller 280 may control MUXs 236, 250 to produce an output from y-axis magnetometer 233, FIG. 2).

When testing a gyroscope of the device, blocks 808 and 810 may be performed together. In other words, according to an embodiment, the calibration controller may send the calibration command to the device while the calibration board is being rotated, so that transducer data from the gyroscope may be collected during the rotation operation. For example, when testing a multi-axis gyroscope of the device, the calibration command may indicate from which of multiple gyroscopes (e.g., which of gyroscopes 222-224, FIG. 2) data should be collected. If the rotation is around the device's x-axis (e.g., x-axis 110, FIG. 1), for example, the calibration command may indicate that transducer data should be collected from the x-axis gyroscope (e.g., x-axis gyroscope 222, FIG. 2). Accordingly, the device may select the output from that gyroscope (e.g., microcontroller 280 may control MUXs 226, 250 to produce an output from x-axis gyroscope 222, FIG. 2).

In block 812, upon receiving the calibration command, each transducer-including device may first de-assert the ready indication, thus signaling to the calibration controller that the transducer-including device is collecting transducer data and, in some embodiments, storing and/or processing the transducer data (e.g., in embodiments in which the transducer-including device includes memory, such as memory 282, and/or a microcontroller, such as microcontroller 280, FIG. 2). As indicated above, the transducer-including device may collect transducer data from one or more transducers associated with the received command. In an embodiment in which the transducer-including device includes a memory (e.g., memory 284, FIG. 2), the transducer-including device may store the transducer data and transducer data processing results in the memory in a manner in which it is correlated with the appropriate transducer, transducer type, and/or sensing axis (or axes).

According to an embodiment, when the transducer-including device has completed the transducer data collection, processing, and storage processes, and when the current device orientation does not correspond to a last orientation in the pre-defined sequence of orientations (as indicated by decision block 814), the transducer-including device may re-assert the ready indicator, in block 816. Re-assertion of the ready indicator indicates to the calibration controller that the transducer-including device is ready to be re-oriented in order to collect, process, and store additional transducer data. The method then iterates as shown.

Conversely, when the transducer-including device has completed the transducer data collection, processing, and storage processes, and when the current device orientation corresponds to a last orientation in the pre-defined sequence of orientations (as indicated by decision block 814), the transducer-including device may calculate calibration coefficients (e.g., gain and/or offset values or codes for each sensing axis) using the stored transducer data, in block 818. Various methods for calculating the calibration coefficients may be used, in various embodiments. Either way, according to an embodiment, the device may store the calibration coefficients for each sensing axis and sensor type in internal memory (e.g., memory 282, FIG. 2) for later use during normal operation of the device. In addition, the device may re-assert the ready indicator, indicating to the calibration controller that the transducer-including device has completed collection of transducer data in the final orientation, and has calculated and stored calibration coefficients.

According to an embodiment, the calibration controller waits to receive the final ready indications from all transducer-including devices on the calibration board, in block 820. Once the calibration controller has received the ready indication from all transducer-including devices (and/or has logged errors for non-responsive devices), in block 822, the calibration controller may send a final command to the transducer-including devices (e.g., in parallel). According to an embodiment, when a transducer-including device receives the final command from the calibration controller, the device may validate results, in block 822 (e.g., determine whether the calibration coefficients fall within acceptable ranges). When the device has completed the validation process, the device may produce a "calibration complete" indicator, in block 824. For example, the calibration complete indicator may include toggling the voltage level (e.g., from a relatively high voltage to a relatively low voltage) on a contact (e.g., one of contacts 292-295, FIG. 2) at a particular frequency (e.g., 50 hertz or some other frequency). Alternatively, the calibration complete indicator may be some other type of signal to the calibration controller. Once the transducer-including device has completed the calibration process, the method may end (e.g., proceed to block 510 of FIG. 5).

Figure 8:
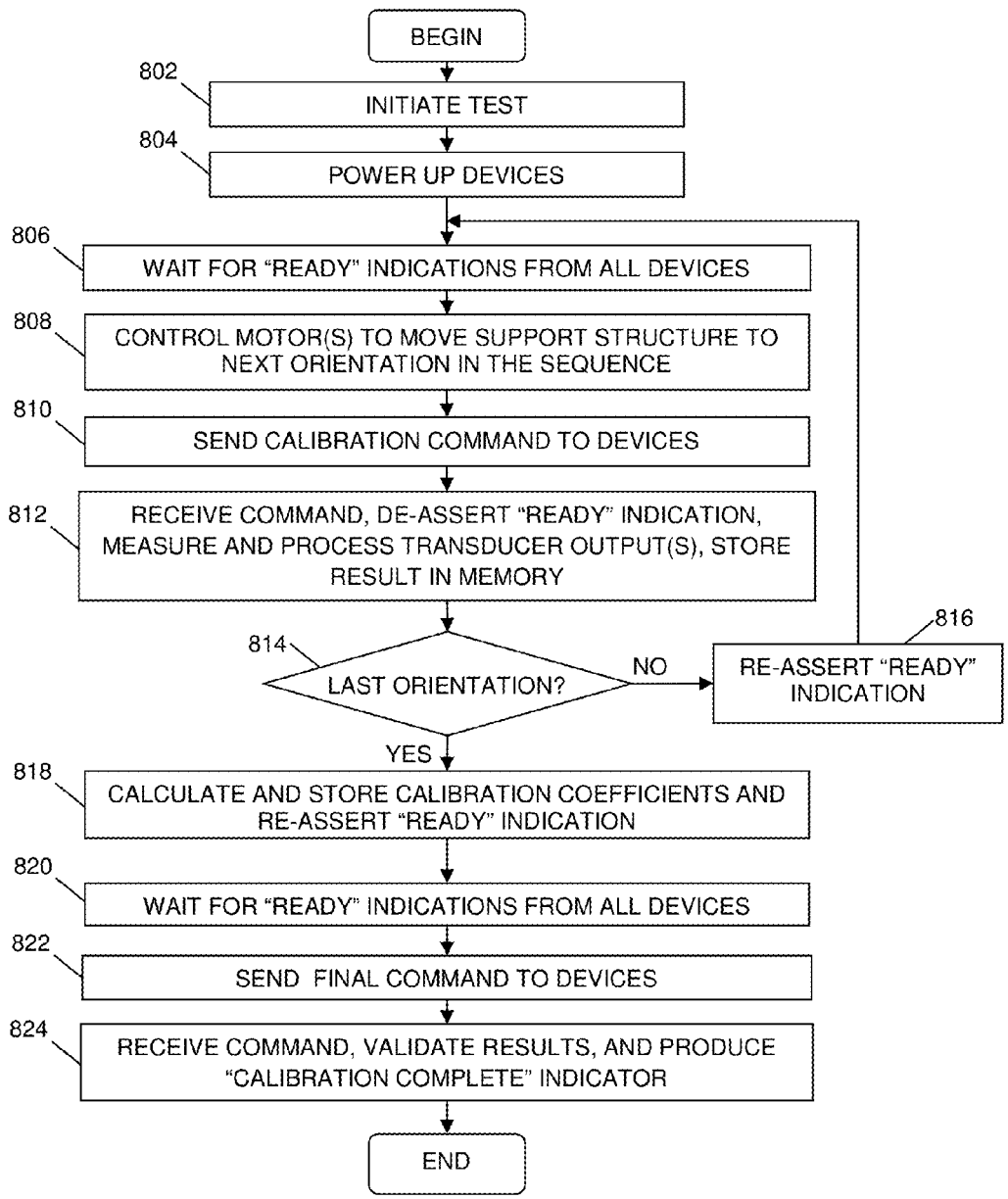
FIG. 8 is a flowchart of a method for calibrating a plurality of transducer-including devices, in accordance with an example embodiment.

Although FIG. 8 illustrates a particular sequence of steps associated with a calibration process, it should be understood that the sequence may be modified while achieving substantially the same result. For example, rather than waiting to calculate calibration coefficients associated with all transducers until the device has been transferred through an entire sequence of orientations and all transducer data has been collected, calibration coefficients for a particular transducer may be calculated as soon as sufficient transducer data for the transducer has been collected. In addition, although various commands and indications are discussed in conjunction with the embodiment illustrated in FIG. 8, the commands and indications may be different from those discussed above. Various other modifications to the embodiments of the calibration method discussed in conjunction with FIG. 8 may be made without departing from the scope of the inventive subject matter.

Figure 9:
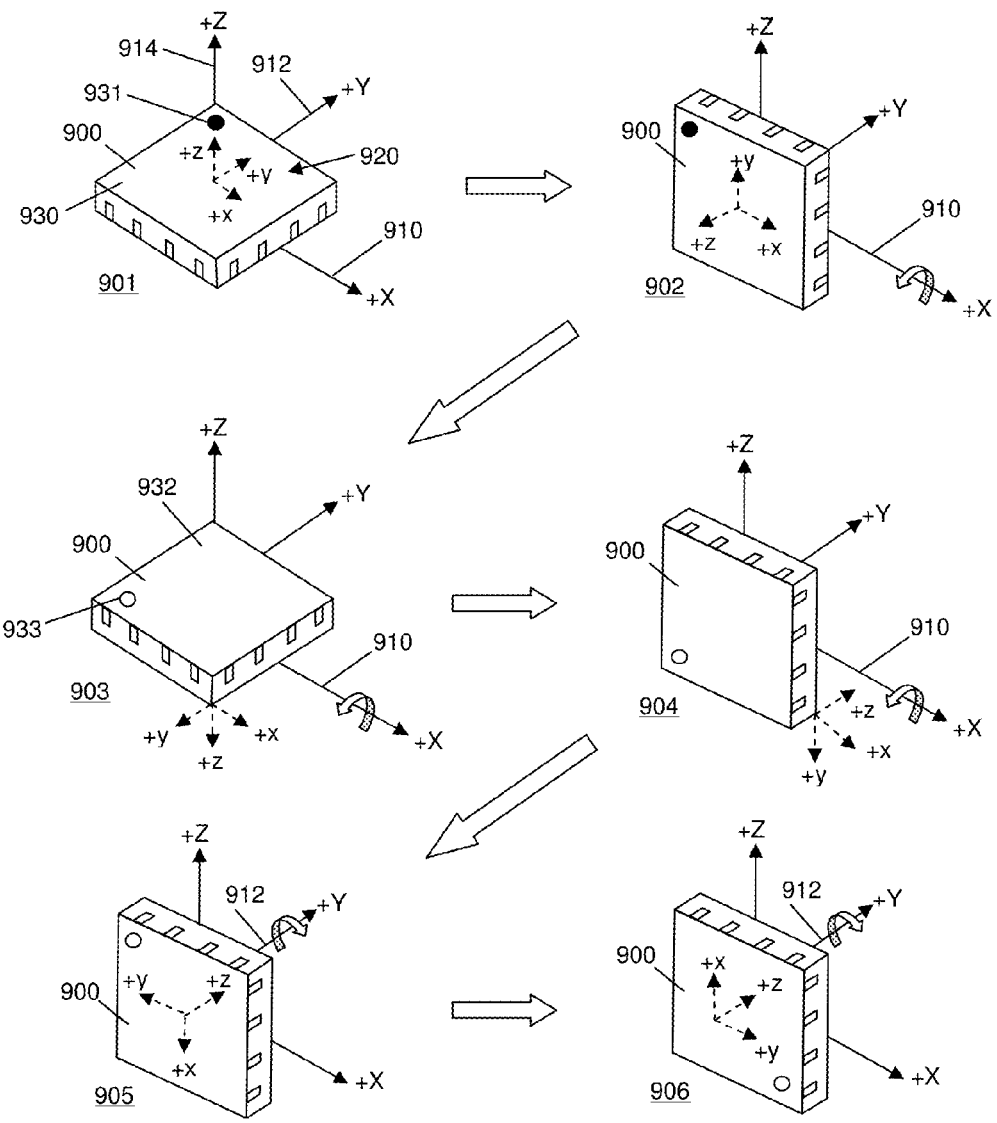
FIG. 9 illustrates an example of a pre-determined sequence of orientations through with a system may put a transducer-including device with respect to a fixed coordinate system, in accordance with an example embodiment.

Referring now to FIG. 9, an example is shown of a predetermined sequence of orientations 901-906 through with a system (e.g., system 300, FIG. 3) may put a transducer-including device 900 with respect to a fixed coordinate system (represented by axes 910, 912, 914), in accordance with an example embodiment. More specifically, FIG. 9 is intended to show a sequence of orientations that a device handling system (e.g., device handling system 350, FIG. 3) may put a plurality of transducer-including devices through under the control of a calibration controller (e.g., calibration controller 310, FIG. 3). To avoid cluttering FIG. 9, the calibration board and board support structure that would make movement of the device 900 and other devices possible is not illustrated. In addition, in FIG. 9, a "pin 1" top surface indicator 931 is illustrated as a solid black circle on the top surface 930 of device 900. To indicate a corresponding corner of device 900 in orientations in which only the bottom surface 932 of device 900 is shown (i.e., orientations 903-906), a "pin 1" bottom surface indicator 933 is illustrated as a white-filled circle on the bottom surface 932 of device 900.

Transducer data from accelerometers and magnetometers within device 900 (e.g., accelerometers 212-214 and magnetometers 232-234, FIG. 2) may be collected when device 900 is in each of the orientations 901-906, in an embodiment. Conversely, transducer data from gyroscopes (e.g., gyroscopes 222-224, FIG. 2) may be collected while device 900 is being moved from one orientation to another at a pre-defined rate of rotation. In the example sequence of FIG. 9, device 900 is transitioned to a plurality of orientations 901-906 in which orthogonal device-fixed axes 920 align with orthogonal fixed axes 910, 912, 914. In an embodiment, device 900 is transitioned from one orientation by rotating device 900 around one of the fixed axes 910, 912, 914. According to an embodiment, a calibration system capable of achieving the orientations 901-906 shown in FIG. 9 would be capable of, at least, rotating device 900 around two fixed, orthogonal axes (e.g., X-axis 910 and Z-axis 914). In other embodiments, a calibration system may be capable of rotating devices around a single axis (e.g., as in the embodiment illustrated in FIGS. 6 and 7), or a calibration system may be capable of rotating devices around all three orthogonal axes.

In the example of FIG. 9, for the purpose of further explanation, one may assume that a primary acceleration, force or field being sensed is strongest along the Z-axis 914 of the fixed coordinate system. For example, a gravitational force vector may extend in the −Z direction along Z-axis 914. Accordingly, in the first orientation 901, device 900 would experience a +1 G acceleration due to gravity along the device-fixed z-axis, and 0 G acceleration due to gravity along the device-fixed x-axis and y-axis. If device 900 is rotated (e.g., by device handling system 350, FIG. 3) by 90 degrees around the fixed X-axis 910 to second orientation 902, device 900 would experience a +1 G acceleration due to gravity along the device-fixed y-axis, and 0 G acceleration due to gravity along the device-fixed x-axis and z-axis. If device 900 is thereafter rotated by 90 degrees around the fixed X-axis 910 to third orientation 903, device 900 would experience a −1 G acceleration due to gravity along the device-fixed z-axis, and 0 G acceleration due to gravity along the device-fixed x-axis and y-axis. If device 900 is thereafter rotated by 90 degrees around the fixed X-axis 910 to fourth orientation 904, device 900 would experience a −1 G acceleration due to gravity along the device-fixed y-axis, and 0 G acceleration due to gravity along the device-fixed x-axis and z-axis. If device 900 is thereafter rotated by 90 degrees around the fixed Y-axis 912 to fifth orientation 905, device 900 would experience a −1 G acceleration due to gravity along the device-fixed x-axis, and 0 G acceleration due to gravity along the device-fixed y-axis and z-axis. Finally, if device 900 is thereafter rotated by 180 degrees around the fixed Y-axis 912 to sixth orientation 906, device 900 would experience a +1 G acceleration due to gravity along the device-fixed x-axis, and 0 G acceleration due to gravity along the device-fixed y-axis and z-axis.

In an example embodiment, device 900 may include a three-axis accelerometer (e.g., device 900 includes x-axis accelerometer 212, y-axis accelerometer 213, and z-axis accelerometer 214, FIG. 2) and each accelerometer is associated with a corresponding device-fixed axis 920. An embodiment of a calibration controller may send calibration commands to device 900 when device 900 is in each of orientations 901-906, where each calibration command would indicate which accelerometer outputs should be collected while in the given orientation 901-906. More specifically, in the example, each calibration command would indicate that samples should be collected from the accelerometer corresponding to the device-fixed axis 920 currently aligned with the fixed Z-axis 914. In addition, the calibration command may indicate the direction of alignment (e.g., in the positive or negative direction). In other words, each calibration command may indicate the orientation 901-906 in which the device 900 has been placed. After collecting accelerometer data for a given device-fixed axis, a microcontroller of the device 900 (e.g., microcontroller 280, FIG. 2) may calculate calibration coefficients for the accelerometer associated with that axis, and store the calibration coefficients in memory (e.g., memory 282, FIG. 2), in an embodiment.

In another example embodiment, device 900 may include a three-axis magnetometer (e.g., device 900 includes x-axis magnetometer 232, y-axis magnetometer 233, and z-axis magnetometer 234, FIG. 2), and one may assume for example that a primary magnetic field being sensed is strongest along the Z-axis 914 of the fixed coordinate system. Each magnetometer may be associated with a corresponding device-fixed axis 920. An embodiment of a calibration controller may send calibration commands to device 900 when device 900 is in each of orientations 901-906, where each calibration command would indicate which magnetometer outputs should be collected while in the given orientation 901-906. More specifically, in the example, each calibration command would indicate that samples should be collected from the magnetometer corresponding to the device-fixed axis 920 currently aligned with the fixed Z-axis 914. In addition, the calibration command may indicate the direction of alignment (e.g., in the positive or negative direction). After collecting magnetometer data for a given device-fixed axis, a microcontroller of the device 900 (e.g., microcontroller 280, FIG. 2) may calculate calibration coefficients for the magnetometer associated with that axis, and store the calibration coefficients in memory (e.g., memory 282, FIG. 2), in an embodiment.

In yet another example embodiment, device 900 may include a three-axis gyroscope (e.g., device 900 includes x-axis gyroscope 222, y-axis gyroscope 223, and z-axis gyroscope 224, FIG. 2), and each gyroscope may be associated with a corresponding device-fixed axis 920. An embodiment of a calibration controller may send calibration commands to device 900 while device 900 is rotating between orientations 901-906, and each calibration command would indicate which gyroscope outputs should be collected while being rotated between orientations 901-906. More specifically, in the example, each calibration command would indicate that samples should be collected from the gyroscope corresponding to the device-fixed axis 920 around which the device 900 is being rotated. In addition, the calibration command may indicate the direction of rotation (e.g., in the positive or negative direction) and/or the rate of rotation. After collecting gyroscope data for a given device-fixed axis, a microcontroller of the device 900 (e.g., microcontroller 280, FIG. 2) may calculate calibration coefficients for the gyroscope associated with that axis, and store the calibration coefficients in memory (e.g., memory 282, FIG. 2), in an embodiment.

It is to be understood that FIG. 9 is intended to show an example of a pre-determined sequence of orientations 901-906, and the example shown should not be construed as limiting. Other pre-determined sequences may include transitioning a device through orientations 901-906 in a different order, transitioning a device through a subset of orientations 901-906, and/or transitioning a device through additional and/or different orientations than those shown in FIG. 9. In addition, in each of the orientations 901-906, one of the device-fixed axes 920 is aligned with a gravitational force or the primary orientation of a magnetic field (e.g., aligned with the Z-axis 914 of the fixed coordinate system), and the other device-fixed axes 920 are in a plane orthogonal to the Z-axis. Accordingly, maximum sensor output values would be expected for the sensors associated with the device-fixed axis aligned with the Z-axis 914, and negligible sensor output values would be expected for the sensors associated with the device-fixed axes that are not aligned with the Z-axis 914. In other embodiments, a device may be transitioned through a sequence of orientations in which none of the device-fixed axes are aligned with a gravitational force or the primary orientation of a magnetic field. In such embodiments, components of the gravitational force or magnetic field strength may be experienced along multiple ones of the device-fixed axes, and calibration coefficients may be calculated accordingly.

Figure 10:
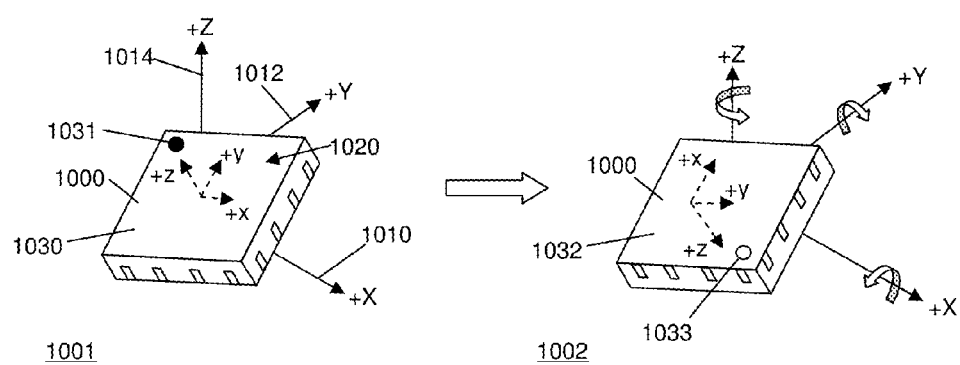
FIG. 10 illustrates an example of a pre-determined sequence of orientations through with a system may put a transducer-including device with respect to a fixed coordinate system, in accordance with another example embodiment.

For example, FIG. 10 illustrates an example of a pre-determined sequence of orientations 1001, 1002 through with a system (e.g., system 300, FIG. 3) may put a transducer-including device 1000 with respect to a fixed coordinate system (represented by axes 1010, 1012, 1014), in accordance with another example embodiment. In FIG. 10, a "pin 1" top surface indicator 1031 is shown on the top surface 1030 of device 1000 in orientation 1001, and a "pin 1" bottom surface indicator 1033 is shown on the bottom surface 1032 of device 1000 in orientation 1002.

Again, transducer data from accelerometers and magnetometers within device 1000 (e.g., accelerometers 212-214 and magnetometers 232-234, FIG. 2) may be collected when device 1000 is in each of the orientations 1001, 1002, in an embodiment. Conversely, transducer data from gyroscopes (e.g., gyroscopes 222-224, FIG. 2) may be collected while device 1000 is being moved from one orientation to another at pre-defined rates of rotation around the fixed axes 1010, 1012, 1014. In the example sequence of FIG. 10, device 1000 is transitioned from a first orientation 1001 in which each of orthogonal device-fixed axes 1020 are angularly offset from corresponding orthogonal fixed axes 1010, 1012, 1014 by approximately 45 degrees, to a second orientation 1002 in which each of device-fixed axes 1020 are angularly offset from corresponding fixed axes 1010, 1012, 1014 by approximately 225 degrees. In an embodiment, device 900 is transitioned from one orientation by rotating device 900 around one of the fixed axes 910, 912, 914. The angular offsets between the device fixed axes 1020 and the corresponding fixed axes 1010, 1012, 1014 may be achieved, in an embodiment by using a board support structure (e.g., board support structure 354, FIG. 3) that is configured to support a calibration board (e.g., calibration board 370, FIG. 3) at 45 degree angles with respect to the axes of rotation of the motor(s) (e.g., motor(s) 356, FIG. 3).

In the example of FIG. 10, when a primary force being sensed is strongest along the Z-axis 1014 of the fixed coordinate system, approximately equal rates of acceleration (e.g., about +/−0.33 G) should be sensed by each accelerometer of a three-axis accelerometer of the device 1000. According to an embodiment, a calibration controller sends a command to device 1000 in each orientation 1001, 1002, and after collecting accelerometer data for each of the device-fixed axes, a microcontroller of the device 1000 (e.g., microcontroller 280, FIG. 2) may calculate calibration coefficients for each of the accelerometers using appropriate vector mathematics. Device 1000 may thereafter store the calibration coefficients in memory (e.g., memory 282, FIG. 2), in an embodiment.

Similarly, when a primary magnetic field being sensed is strongest along the Z-axis 1014 of the fixed coordinate system, approximately equal magnetic field strength magnitudes should be sensed by each magnetometer of a three-axis magnetometer of the device 1000. According to an embodiment, a calibration controller sends a command to device 1000 in each orientation 1001, 1002, and after collecting magnetometer data for each of the device-fixed axes, a microcontroller of the device 1000 (e.g., microcontroller 280, FIG. 2) may calculate calibration coefficients for each of the magnetometers using appropriate vector mathematics. Device 1000 may thereafter store the calibration coefficients in memory (e.g., memory 282, FIG. 2), in an embodiment.

An embodiment of a system for calibrating a plurality of transducer-including devices includes a board support structure, one or more motors, a motor control module, and a calibration control module. The board support structure is configured to hold a calibration board in a fixed position with respect to the board support structure. The one or more motors are configured to rotate the board support structure around one or more axes of a fixed coordinate system. The motor control module is configured to send motor control signals to the one or more motors to cause the one or more motors to move the board support structure through a series of orientations with respect to the fixed coordinate system. The calibration control module is configured to send, through a communication structure, signals to the plurality of transducer-including devices loaded into a plurality of sockets of the calibration board, wherein the signals cause the transducer-including devices to generate transducer data while the board support structure is in or moving toward each orientation of the series of orientations.

An embodiment of a method for calibrating a plurality of transducer-including devices includes sending motor control signals to one or more motors to cause the one or more motors to move a board support structure through a series of orientations with respect to a fixed coordinate system. The board support structure is configured to hold a calibration board in a fixed position with respect to the board support structure, and the calibration board includes a plurality of sockets within which the plurality of transducer-including devices are installed. The method further includes sending, through a communication structure, signals to the plurality of transducer-including devices. The signals cause the transducer-including devices to generate transducer data while the board support structure is in or moving toward each orientation of the series of orientations.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for calibrating a plurality of transducer-including devices, the system comprising:
   a board support structure configured to hold a calibration board in a fixed position with respect to the board support structure;
   one or more motors configured to rotate the board support structure around one or more axes of a fixed coordinate system;
   a motor control module configured to send motor control signals to the one or more motors to cause the one or more motors to move the board support structure through a series of orientations with respect to the fixed coordinate system;
   the calibration board, wherein the calibration board includes a substrate, a plurality of sockets, a first connector, and a plurality of conductors, wherein each socket of the plurality of sockets includes a plurality of socket contacts configured to connect with a corresponding plurality of contacts of a transducer-including device, the plurality of conductors is configured to convey signals between the first connector and the plurality of socket contacts, and the first connector is configured to couple with a communication structure; and
   a calibration control module configured to send, through the communication structure, signals to the plurality of transducer-including devices, which are loaded into the plurality of sockets of the calibration board, wherein the signals cause the transducer-including devices to generate transducer data while the board support structure is in or moving toward each orientation of the series of orientations.

2. The system of claim 1, wherein the signals further cause the transducer-including devices to calculate calibration coefficients using the transducer data, wherein the calibration coefficients are selected from a gain value, a gain code, an offset value, and an offset code.

3. The system of claim 2, wherein the signals further cause the transducer-including devices to store the calibration coefficients in memory of the transducer-including devices.

4. The system of claim 1, further comprising:
   a processing component configured to receive the transducer data, and to calculate calibration coefficients using the transducer data, wherein the calibration coefficients are selected from a gain value, a gain code, an offset value, and an offset code.

5. The system of claim 4, further comprising:
   a circuit board coupled to the board support structure, wherein the processing component is coupled to the circuit board.

6. The system of claim 1, wherein the calibration control module is further configured to receive the transducer data from the transducer-including devices, and to calculate calibration coefficients using the transducer data, wherein the calibration coefficients are selected from a gain value, a gain code, an offset value, and an offset code.

7. The system of claim 1, wherein at least a portion of the calibration control module is coupled to the board support structure.

8. The system of claim 1, wherein:
   each socket of the plurality of sockets is identifiable by a unique identifier, and
   the calibration control module is further configured to store information relating to a particular transducer-including device installed in a particular socket using the unique identifier as a key.

9. The system of claim 1, further comprising:
   the communication structure, wherein the communication structure includes a second connector coupled to the board support structure, wherein the calibration board is configured to be coupled with the board support structure by connecting the first and second connectors using a reasonable force, and wherein the calibration board is configured to be removed from the board support structure by disconnecting the first and second connectors using a reasonable force.

10. The system of claim 1, further comprising:
a base configured to support the board support structure as the board support structure is moved through the series of orientations.

11. The system of claim 1, wherein:
the board support structure is further configured to hold at least one additional calibration board in a fixed position with respect to the board support structure; and
the calibration control module is further configured to send, through the communication structure, the signals to a plurality of transducer-including devices loaded into a plurality of sockets of the at least one additional calibration board.

12. A method for calibrating a plurality of transducer-including devices, the method comprising the steps of:
sending motor control signals to one or more motors to cause the one or more motors to move a board support structure through a series of orientations with respect to a fixed coordinate system, wherein the board support structure is configured to hold a calibration board in a fixed position with respect to the board support structure, and the calibration board includes a plurality of sockets within which the plurality of transducer-including devices are installed, and wherein each socket of the plurality of sockets is identifiable by a unique identifier;
sending, through a communication structure, signals to the plurality of transducer-including devices, wherein the signals cause the transducer-including devices to generate transducer data while the board support structure is in or moving toward each orientation of the series of orientations; and
storing information relating to a particular transducer-including device installed in a particular socket using the unique identifier as a key.

13. The method of claim 12, wherein sending the motor control signals comprises:
sending the motor control signals to cause the one or more motors to move the board support structure through a series of orientations that includes at least one orientation in which a device-fixed axis of the transducer-including devices is aligned with an axis of the fixed coordinate system along which a maximum intensity of an acceleration, a force or a field is present.

14. The method of claim 12, wherein sending the motor control signals comprises:
sending the motor control signals to cause the one or more motors to move the board support structure through a series of orientations that includes at least one orientation in which at least one device-fixed axis of the transducer-including devices is angularly offset from an axis of the fixed coordinate system along which a maximum intensity of an acceleration, a force or a field is present.

15. The method of claim 12, wherein the signals further cause the transducer-including devices to calculate calibration coefficients using the transducer data, wherein the calibration coefficients are selected from a gain value, a gain code, an offset value, and an offset code.

16. The method of claim 15, wherein the signals further cause the transducer-including devices to store the calibration coefficients in memory of the transducer-including devices.

17. The method of claim 12, further comprising:
receiving the transducer data from the plurality of transducer-including devices; and
calculating calibration coefficients using the transducer data, wherein the calibration coefficients are selected from a gain value, a gain code, an offset value, and an offset code.

18. A method for calibrating a plurality of transducer-including devices, the method comprising the steps of:
sending motor control signals to one or more motors to cause the one or more motors to move a board support structure through a series of orientations with respect to a fixed coordinate system, wherein the board support structure is configured to hold a calibration board in a fixed position with respect to the board support structure, and the calibration board includes a plurality of sockets within which the plurality of transducer-including devices are installed; and sending, through a communication structure, signals to the plurality of transducer-including devices, wherein the signals cause the transducer-including devices to generate transducer data while the board support structure is in or moving toward each orientation of the series of orientations; and
producing a magnetic field that passes through the board support structure prior to sending the signals to the plurality of transducer-including devices.

19. A method for calibrating a plurality of transducer-including devices, the method comprising the steps of:
loading the plurality of transducer-including devices into the plurality of sockets of the calibration board;
installing the calibration board in the board support structure by coupling a first connector of the calibration board with a second connector of the board support system; and
after installing the calibration board in the board support structure, sending motor control signals to one or more motors to cause the one or more motors to move a board support structure through a series of orientations with respect to a fixed coordinate system, wherein the board support structure is configured to hold a calibration board in a fixed position with respect to the board support structure, and the calibration board includes a plurality of sockets within which the plurality of transducer-including devices are installed; and
sending, through a communication structure, signals to the plurality of transducer-including devices, wherein the signals cause the transducer-including devices to generate transducer data while the board support structure is in or moving toward each orientation of the series of orientations.

20. The method of claim 19, further comprising, after completion of moving the board support structure through the series of orientations:
disconnecting the calibration board from the board support structure by disconnecting the first connector from the second connector; and
performing a burn-in process using the calibration board with the plurality of transducer-including devices still loaded in the calibration board.

* * * * *